(12) United States Patent
Bhowmick et al.

(10) Patent No.: US 11,501,008 B2
(45) Date of Patent: *Nov. 15, 2022

(54) DIFFERENTIAL PRIVACY USING A MULTIBIT HISTOGRAM

(71) Applicant: Apple Inc., Cupertino, CA (US)

(72) Inventors: Abhishek Bhowmick, San Francisco, CA (US); Andrew H. Vyrros, San Francisco, CA (US); Matthew R. Salesi, San Francisco, CA (US); Umesh S. Vaishampayan, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 182 days.

This patent is subject to a terminal disclaimer.

(21) Appl. No.: 16/938,741

(22) Filed: Jul. 24, 2020

(65) Prior Publication Data

US 2020/0356685 A1 Nov. 12, 2020

Related U.S. Application Data

(63) Continuation of application No. 15/721,894, filed on Sep. 30, 2017, now Pat. No. 10,726,139.

(Continued)

(51) Int. Cl.
*G06F 21/60* (2013.01)
*G06F 17/16* (2006.01)
(Continued)

(52) U.S. Cl.
CPC ............ *G06F 21/606* (2013.01); *G06F 16/26* (2019.01); *G06F 17/145* (2013.01); *G06F 17/16* (2013.01);
(Continued)

(58) Field of Classification Search
CPC ...... G06F 21/606; G06F 16/26; G06F 17/145; G06F 17/16; G06F 17/18; G06F 21/6254;
(Continued)

(56) References Cited

U.S. PATENT DOCUMENTS 7,620,667 B2 11/2009 Rollin et al.
8,661,047 B2 2/2014 Talwar et al.
(Continued)

OTHER PUBLICATIONS

Thong T. Nguyen, et al., "Collecting and Analyzing Data from Smart Device Users with Local Differential Privacy", Article, Jun. 16, 2016, XP080708811, New York, NY, 11 pgs.
(Continued)

*Primary Examiner* — Abiy Getachew
(74) *Attorney, Agent, or Firm* — Kilpatrick Townsend & Stockton LLP

(57) ABSTRACT

Embodiments described herein ensure differential privacy when transmitting data to a server that estimates a frequency of such data amongst a set of client devices. The differential privacy mechanism may provide a predictable degree of variance for frequency estimations of data. The system may use a multibit histogram model or Hadamard multibit model for the differential privacy mechanism, both of which provide a predictable degree of accuracy of frequency estimations while still providing mathematically provable levels of privacy.

20 Claims, 15 Drawing Sheets

Related U.S. Application Data

(60) Provisional application No. 62/514,935, filed on Jun. 4, 2017.

(51) Int. Cl.
| | | |
|---|---|---|
| *G06F 17/14* | (2006.01) | |
| *G06F 16/26* | (2019.01) | |
| *H04L 9/32* | (2006.01) | |
| *G06F 21/62* | (2013.01) | |
| *G06F 17/18* | (2006.01) | |

(52) U.S. Cl.
CPC .......... *G06F 17/18* (2013.01); *G06F 21/6254* (2013.01); *H04L 9/3239* (2013.01); *H04L 2209/34* (2013.01); *H04L 2209/42* (2013.01)

(58) Field of Classification Search
CPC ............... H04L 9/3239; H04L 2209/34; H04L 2209/42
See application file for complete search history.

(56) References Cited

U.S. PATENT DOCUMENTS

| | | |
|---|---|---|
| 9,195,703 B1 | 11/2015 | Kirmse et al. |
| 9,402,112 B1 | 7/2016 | Levine et al. |
| 10,726,139 B2 | 7/2020 | Bhowmick et al. |
| 2003/0053622 A1 | 3/2003 | Bruen et al. |
| 2005/0108297 A1 | 5/2005 | Rollin et al. |
| 2009/0136023 A1 | 5/2009 | Pan et al. |
| 2010/0008265 A1* | 1/2010 | Freer .................. H04N 1/00307 455/414.1 |
| 2011/0064221 A1 | 3/2011 | McSherry et al. |
| 2011/0208763 A1 | 8/2011 | McSherry et al. |
| 2011/0268225 A1 | 11/2011 | Cronie et al. |
| 2012/0143922 A1 | 6/2012 | Rane et al. |
| 2012/0204026 A1 | 8/2012 | Shi et al. |
| 2012/0260111 A1 | 10/2012 | Tarkoma |
| 2012/0296898 A1 | 11/2012 | Cormode et al. |
| 2012/0316956 A1 | 12/2012 | Nath et al. |
| 2013/0145473 A1 | 6/2013 | Cormode et al. |
| 2013/0212690 A1 | 8/2013 | Farwaz et al. |
| 2014/0196151 A1 | 7/2014 | Mishra et al. |
| 2014/0281572 A1 | 9/2014 | Wang et al. |
| 2014/0283091 A1 | 9/2014 | Zhang et al. |
| 2015/0293923 A1 | 10/2015 | Eide et al. |
| 2015/0339493 A1 | 11/2015 | Ioannidis et al. |
| 2015/0371059 A1 | 12/2015 | Bilogrevic et al. |
| 2015/0372808 A1* | 12/2015 | Bilogrevic ............. G06N 7/005 380/279 |
| 2016/0071170 A1 | 3/2016 | Massoulie et al. |
| 2016/0203333 A1 | 7/2016 | Fawaz et al. |
| 2016/0266824 A1 | 9/2016 | Niu et al. |
| 2017/0357820 A1 | 12/2017 | Sierra et al. |
| 2018/0181878 A1 | 6/2018 | Kasiviswanathan et al. |
| 2018/0198602 A1 | 7/2018 | Duffy et al. |
| 2018/0232340 A1 | 8/2018 | Lee |
| 2018/0307854 A1 | 10/2018 | Bernau et al. |
| 2018/0349636 A1 | 12/2018 | Bhowmick et al. |
| 2018/0349637 A1 | 12/2018 | Decker et al. |
| 2018/0349638 A1 | 12/2018 | Barraclough et al. |
| 2019/0057224 A1 | 2/2019 | Zhang et al. |
| 2019/0332807 A1 | 10/2019 | LaFever et al. |

OTHER PUBLICATIONS

International Search Report & Written Opinion received for International Application No. PCT/US2018/024772, dated May 22, 2018, 17 pgs.

Luca Melis et al. "Efficient Private Statistics with Succinct Sketches", Proceedings 2016 Network and Distributed System Security Symposium, Jan. 1, 2016, XP055474108, Reston, VA, 15 pgs.

Jalaj Upadhyay "Randomness Efficient Fast-Johnson-Lindenstrauss Transform with Applications in Differential Privacy and Compressed Sensing", Oct. 9, 2014, XP55474667, 33 pgs.

Cynthia Dwork et al. "Pan-Private Streaming Algorithms", Proceedings of The First Symposium on Innovations in Computer Science, Jan. 1, 2010, XP055474103, 32 pgs.

International Search Report and Written Opinion for PCT/US2018/024801 dated May 23, 2018, 19 pgs.

Roy, S. Setty, A. Kilzer, V. Shmatikov, E. Witchel. "Airavat: Security and Privacy for MapReduce." NSDI, 2010.

Cynthia Dwork and Aaron Roth. "The Algorithmic Foundations of Differential Privacy." Foundations and Trends in Theoretical Computer Science, vol. 9, Nos. 3-4, Aug. 2014.

Chao Li and Gerome Miklau. "An Adaptive Mechanism for Accurate Query Answering under Differential Privacy." Proc. VLDB Endowment, pp. 514-525, Feb. 2012.

Fanti, G., Pihur, V. and Erlingsson, Li. "Building a RAPPOR with the Unknown: Privacy-Preserving Learning of Associations and Data Dictionaries." Proceedings on Privacy Enhancing Technologies. vol. 2016, Issue 3, pp. 11-61.

Dwork, C., McSherry, F., Nissim, K., Smith, A. "Calibrating Noise to Sensitivity in Private Data Analysis." Theory of :; ryptography. TCC 2006. Lecture Notes in Computer Science, vol. 3876. Springer, Berlin, Heidelberg.

Vadhan, Salil. "The Complexity of Differential Privacy." Center for Research on Computation & Society John A. Paulson School of Engineering & Applied Sciences Harvard University, Aug. 9, 2016.

Chaudhuri, S., Kaushik, R. and Ramamurthy, R. "Database Access Control & Privacy: Is There A Common Ground?" In: Proceedings of CIDR 2011, pp. 96-103 (2011 ).

Liu, C., Chakraborty, S. and Mittal, P. "Dependence makes you Vulnerable: Differential Privacy under Dependent Tuples." NOSS '16, Feb. 21-24, 2016.

Ding, B., Winslett, M., Han, J., & Li, Z. "Differentially Private Data Cubes: Optimizing Noise Sources and Consistency." In Proceedings of SIGMOD 2011 and PODS 2011,2011, pp. 217-228.

Mohammed, N., Chen, R., Fung, B., and Yu, P. "Differentially Private Data Release for Data Mining." KDD'11, Aug. 21-24, 2011, pp. 493-501.

J. Hsu, M. Gaboardi, A. Haeberlen, S. Khanna, A. Narayan, B.C. Pierce, and A. Roth. "Differential Privacy: An Economic Method for Choosing Epsilon." Proc. of CSF 2014.

Ebadi, H., Sands, D. Schneider, G. "Differential Privacy: Now it's Gelling Personal." In: POPL 2015, ACM, 2015, pp. 59-81.

Kueyang Hu, et al. "Differential Privacy in Telco Big Data Platform." Proceedings of the VLDB Endowment, 8(12): 1692-1703, 2015.

Alvin, M.S., et al. "Differential Privacy: On The Trade-0ff between Utility and Information Leakage." Proceedings of the 8th International Workshop on Formal Aspects of Security & Trust (FAST 11), Springer, LNCS 7140, 2011.

Haeberlen, Andreas, et al. "Differential Privacy Under Fire." In USENIX'11, 2011.

Narayan, Arjun. "Distributed Differential Privacy and Applications." Presented to the Faculties of the University of Pennsylvania, 2015.

Ning Zhang, Ming Li, and Wenjing Lou. "Distributed Data Mining with Differential Privacy." In IEEE International :; Conference on Communications, 2011.

Narayan, Arjun Ravi, "Distributed Differential Privacy and Applications." Publicly Accessible Penn Dissertations, Jan. 1, 2015.

Hamid Ebadi and David Sands. "Featherweight PINQ." CoRR, 2015.

Mohan, Prashanth. "GUPT: Privacy Preserving Data Analysis made Easy," Proceedings of the 2012 ACM SIGMOD International Conference on Management of Data, May 20-24, 2012.

Ikkus, I. et al. "Non-tracking Web Analytics." CCS'12, ACM, Oct. 16-18, 2012.

Lee, Sangmin, et al. "[pi]box: A Platform for Privacy-Preserving Apps." In 1 0th USENIX Symposium on Networked Systems Design and Implementation (NSDI '13),2013.

R. A. Popa, et al. "Privacy and Accountability for Location-based Aggregate Statistics." In Proceedings of the 18th ACM Conference on Computerand Communications Security, Oct. 17-21, 2011.

(56) References Cited

OTHER PUBLICATIONS

Kandappu, Thivya, et al. "Privacy in Crowdsourced Platforms." Springer International Publishing: Privacy in a Digital, Networked Wo?d. 2015, pp. 57-84.

Apple Inc. IOS Security Guide—Mar. 2017.

J. M. Abowd. The Challenge of Scientific Reproducibility and Privacy Protection for Statistical Agen-cies. https://www2.census.gov/cac/sac/meetings/2016-09/2016-abowd.pdf, Sep. 15, 2016. Census Scientific Advisory Committee.

R. Bassily and A. Smith. Local, Private, Efficient Protocols for Succinct Histograms. In STOC, 2015.

G. Cormode and S. Muthukrishnan. An improved data stream summary: The count-min sketch and its applications. J. Algorithms, 55(1):58-75, Apr. 2005.

J. C. Duchi, M. Jordan, M. J. Wainwright, et al. Local Privacy and Statistical Minimax Rates. In FOCS. IEEE, 2013.

C. Dwork, M. Naor, T. Pitassi, and G. N. Rothblum. Differential privacy under continual observation. In Proceedings of the Forty-second ACM Symposium on Theory of Computing, STOC '10, pp. 715-724, New York, Ny, USA, 2010. ACM.

Ú. Erlingsson, V. Pihur, and A. Korolova. RAPPOR: Randomized Aggregatable Privacy-Preserving Ordinal Response. In ACM CCS, 2014.

M.Gaboardi,J.Honaker,G.King,K.Nissim,J.Ullman,S.Vadhan,andJ.Murtagh.PSI($\psi$):a Private data Sharing Interface. In Theory and Practice of Differential Privacy, 2016.

J. Hsu, S. Khanna, and A. Roth. Distributed Private Heavy Hitters. In ICALP. 2012.

S. P. Kasiviswanathan, H. K. Lee, K. Nissim, S. Raskhodnikova, and A. Smith. What Can We Learn Privately? SIAM Journal on Computing, 40(3):793-826, 2011.

X. Machanavajjhala, D. Kifer, J. Abowd, J. Gehrke, and L. Vilhuber. Privacy: Theory Meets Practice on the Map. In Proceedings of the 2008 IEEE 24th International Conference on Data Engineering, ICDE '08, pp. 277-286, Washington, DC, USA, 2008. IEEE Computer Society.

F. D. McSherry. Privacy integrated queries: An extensible platform for privacy-preserving data anal-ysis. In Proceedings of the 2009 ACM SIGMOD International Conference on Management of Data, SIGMOD '09, pp. 19-30, New York, NY, USA, 2009. ACM.

N. Mishra and M. Sandler. Privacy via Pseudorandom Sketches. In PODS, 2006.

Z. Qin, Y. Yang, T. Yu, I. Khalil, X. Xiao, and K. Ren. Heavy hitter estimation over set-valued data with local differential privacy. In Proceedings of the 2016 ACM SIGSAC Conference on Computer and Communications Security, CCS '16, pp. 192-203, New York, NY, USA, 2016. ACM.

\* cited by examiner

PROCESS FOR PERFORMING A
MULTIBIT HISTOGRAM MODEL
400

401 — SELECT A VALUE OF USER DATA TO TRANSMIT TO A SERVER AMONGST A SET OF POSSIBLE USER DATA VALUES COLLECTED ON A CLIENT DEVICE

402 — ENCODE THE SELECTED VALUE USING A VECTOR OF BIT VALUES, WHEREIN THE ENCODING UPDATES THE BIT VALUE AT A BIT POSITION CORRESPONDING TO THE VALUE OF USER DATA

403 — DIFFERENTIALLY PRIVATIZE THE VECTOR BY CHANGING EACH BIT VALUE OF THE VECTOR WITH A PREDEFINED PROBABILITY

404 — TRANSMIT THE PRIVATIZED VECTOR TO THE SERVER AND THE SERVER PERFORMS A SUMMATION OPERATION WITH THE PRIVATIZED VECTOR TO ESTIMATE A FREQUENCY OF THE VALUE OF USER DATA AMONGST A SET OF DIFFERENT CLIENT DEVICES

*FIG. 4*

DIFFERENTIAL PRIVACY USING A MULTIBIT HISTOGRAM

CROSS-REFERENCE

This application is a continuation of U.S. patent application Ser. No. 15/721,894, filed Sep. 30, 2017, which claims the benefit of U.S. Provisional Patent Application 62/514,935 filed Jun. 4, 2017, each of which are hereby incorporated herein by reference.

TECHNICAL FIELD

This disclosure relates generally to the field of differential privacy. More specifically, this disclosure relates to a system that ensures differential privacy when transmitting data to a server that estimate a frequency of such data.

BACKGROUND

As the amount of information collected in an online environment grows, individuals are increasingly protective of providing various forms of information. Accordingly, differential privacy has become an important consideration for providers that aggregate online information. In a crowd-sourced, client/server environment, local differential privacy introduces randomness into user data prior to a client sharing the user data with a server. A server can learn from the aggregation of the crowdsourced data of all clients, but the server cannot learn the data provided by any particular client. As more user information is gathered, general patterns begin to emerge, which can inform and enhance the user experience. Accordingly, differential privacy provides insights from large datasets, but with a mathematical proof that information about a single individual remains private.

As described, local differential privacy introduces randomness into data, and accordingly, usage patterns are based on mathematical estimations. Depending on the size of the universe of potential user data, the variance in the accuracy of these estimations may increase in order to preserve differential privacy. Moreover, current differential privacy mechanisms are often tailored for a large universe of datasets based on the potential number of users sharing information. Accordingly, there is continued need to provide mechanisms for accurate estimation while still achieving local differential privacy of user data.

SUMMARY

Embodiments described herein apply differential privacy encoding to user data that used to estimate a frequency of such data amongst a set of client devices. Such embodiments provide differential privacy techniques that can be used to reduce resource requirements while providing provable guarantees regarding privacy and utility.

One embodiment provides for a non-transitory machine-readable medium storing instructions which, when executed by one or more processors of a system, cause the computing device to perform operations comprising selecting a value of user data to transmit to a server, the value selected from a set of user data values collected on a client device; encoding the selected value using a vector of bit values, wherein the encoding updates the bit value at a bit position corresponding to the value of user data; generating a privatized vector by changing, with a predefined probability, one or more bit values of the vector; and transmitting the privatized vector to the server, the server to perform a summation operation with the privatized vector to estimate a frequency of the value of user data from a set of multiple client devices.

One embodiment provides a device, comprising a processor; and a memory coupled to the processor, the memory storing instructions, which when executed by the processor, cause the processor to perform operations to select a value of user data to transmit to a server from a set of user data values collected on a client device, wherein the set of user data values is an indexed set of data values; encode the selected value using a vector, wherein to encode the selected value includes to update a value in a vector, the value associated with the value of the user data; generating a privatized vector by changing, with a predefined probability, one or more values of the vector; and transmitting the privatized vector to the server, wherein the server performs a summation operation with the privatized vector to estimate a frequency of the value of user data amongst a set of different client devices.

One embodiment provides for a non-transitory machine-readable medium storing instructions which, when executed by one or more processors of a system, cause the computing device to perform operations comprising selecting a value of user data to transmit to a server from a set of user data values collected on a client device; encoding the selected value using a Hadamard matrix, wherein the encoding flips a sign of an element of the Hadamard matrix, and wherein the element is selected based on the value of user data and a random integer; privatizing the element by flipping, with a predetermined probability, a sign of the element; and transmitting the privatized element and the random integer to the server, wherein the server performs a summation operation with the privatized element to estimate a frequency of the value of user data amongst a set of different client devices.

Other features of the present embodiments will be apparent from the accompanying drawings and from the detailed description, which follows.

BRIEF DESCRIPTION OF THE DRAWINGS

Embodiments of the disclosure are illustrated by way of example, and not by way of limitation, in the figures of the accompanying drawings in which like reference numerals refer to similar elements.

FIG. 4 is an example flow diagram illustrating a method of differentially privatizing an encoding using a multibit histogram model according to an embodiment of the disclosure.

DETAILED DESCRIPTION

Figure 1:
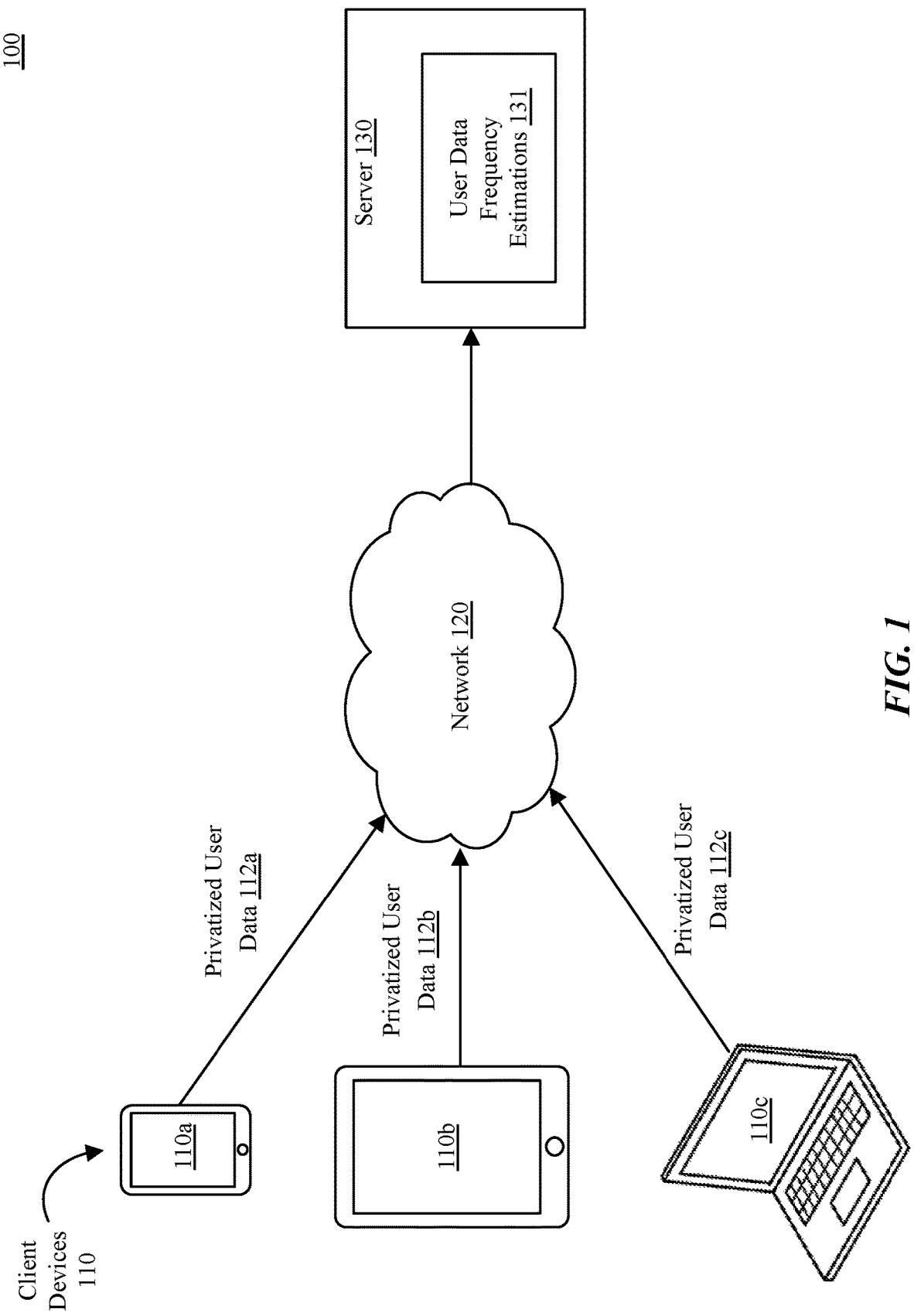
FIG. 1 is a block diagram illustrating an example overview of a system environment according an embodiment of the disclosure.

In embodiments described herein, a server can receive and aggregate crowdsourced data without having the ability to learn the user data provided by any particular client device. Such embodiments provide differential privacy techniques that can be used to reduce resource requirements while providing provable guarantees regarding privacy and utility. Embodiments described herein provide techniques that can be applied to a variety of use cases to enable sensitive data of users to be protected when used for crowdsourced statistical analysis. Example use cases include, but are not limited to, studies involving sensitive user health data. Such health data can be collected by a user device with the consent of the user. Specific exemplary applications include protection of private user data associated with health research or healthcare frameworks enabled on consumer and mobile electronic devices, such as devices provided by Apple® Inc. of Cupertino, Calif. However, the techniques and frameworks described herein have broad application to the protection of crowdsourced user data. Additionally, private user data stored in client or server devices may be protected using the differential privacy techniques described herein.

Various aspects of the embodiments will be described with reference to details discussed below. The accompanying drawings will illustrate details of the various embodiments. The following description and drawings are illustrative and are not to be construed as limiting as to all embodiments. Numerous specific details are described to provide a thorough understanding of various embodiments. However, in certain instances, well-known or conventional details are not described in order to provide a concise discussion of embodiments.

Reference in the specification to "one embodiment" or "an embodiment" or "some embodiments" means that a particular feature, structure, or characteristic described in conjunction with the embodiment can be included in at least one embodiment. The appearances of the phrase "embodiment" in various places in the specification do not necessarily all refer to the same embodiment.

The present disclosure recognizes that the use of personal information data, in the present technology, can be used to the benefit of users. For example, the personal information data can be used to deliver features that is of greater interest to the user. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of sampling usage of features, the present technology can be configured to allow users to select to "opt in" or "opt out" of participation in the collection of personal information data during registration for services. In another example, users can select not to provide usage information. In yet another example, users can select to not provide precise usage information, but permit the transfer of categorized information.

Described is a system (and method) that ensures differential privacy when transmitting data to a server that estimate a frequency of such data amongst a set of client devices. The differential privacy mechanism may provide a predictable degree of variance for frequency estimations of data. Thus, the mechanism provides a certain degree of accuracy of frequency estimations while still providing mathematically provable levels of privacy. In one implementation, the system may use a multibit histogram model for the differential privacy mechanism. The multibit histogram model may send p bits to a server. In one embodiment, p is in the range of approximately 2000 and corresponds to the universe of potential user data values. A server may perform a summation operation to determine a frequency of user data values. The multibit histogram model may provide an estimated frequency variance of $(c_\varepsilon^2-1)/4)N$, where N is the number of users.

In another implementation, the system may use a Hadamard multibit model for the differential privacy mechanism. The Hadamard multibit model may transmit a single privatized bit to a server. Accordingly, a server may perform a summation operation to determine a frequency of user data values. The Hadamard multibit model may provide an estimated frequency variance of $c_\varepsilon^2 \times N$, where $c_\varepsilon$ is a predefined constant. Each model provides a certain degree of accuracy, as the estimated sum of a particular term in the universe can map to a Gaussian distribution in both the multibit histogram model and Hadamard multibit model, where the mean of the Gaussian distribution is the true frequency and the variance is as described above.

As described, the mechanism ensures a provable level of privacy. As a general overview, local differential privacy introduces randomness to client user data prior to sharing the user data. Instead of having a centralized data source D= $\{d1, \ldots, dn\}$, each data entry $d_i$ belongs to a separate client i. Given the transcript $T_i$ of the interaction with client i, it is not possible for an adversary to distinguish $T_i$ from the transcript that would have been generated if the data element were to be replaced by null. The degree of indistinguishability is parameterized by ε, typically considered to be a small constant. The following is a formal definition of local differential privacy.

Let n be the number of clients in a client-server system, let F be the set of all possible transcripts generated from any single client-server interaction, and let $T_i$ be the transcript generated by a differential privacy algorithm A while interacting with client i. Let $d_i \in S$ be the data element for client i. Algorithm A is ε-locally differentially private if, for all subsets $T \subseteq \Gamma$, the following holds:

$$\forall i \in [n], d \in S \left| \ln \frac{Pr[Ti \in \Gamma \mid di = d]}{Pr[Ti \in \Gamma \mid di = \text{null}]} \right| \leq \varepsilon.$$

Here, $d_i$=null refers to the case where the data element for client i is removed.

The systems (and methods) disclosed herein include an ε-local differentially private mechanism that may achieve improvements with respect to accuracy, bandwidth, and computational cost for a client and server while preserving user privacy. As further described herein, the mechanism can be provided within a system environment.

FIG. 1 is a block diagram of an overview of such a system environment 100 according an embodiment of the disclosure. As shown, the system 100 may include client devices 110A-C (or collectively 110) and a server 130, which can be coupled via a network 120. The network 120 can be any suitable type of wired or wireless network such as a local area network (LAN), a wide area network (WAN), or combination thereof.

A client device 110 may include any type of computing device such as a desktop computer, a tablet computer, a smartphone, a television set top box, or other computing device 110 such as iPhone®, Apple® Watch, Apple® TV, etc., as described below with reference to system 1200. A client device 110 can be associated with a user within a large set of users (e.g. crowdsource). Each client device 110 may transmit privatized user data 112A-C (collectively 112) as a differentially private encoding. The purpose of the encoding is to transmit a representation of user data to the server, so that the server cannot directly learn the value of user data transmitted by the particular client. The user data can be any form of information such as information related to a user or information related to user actions performed on the client device. For example, the user data can include health data for the user that has been collected by the user device with the consent of the user. Health data can include heart rate information or other health-related data collected by a user device. The data can also include information such as an activity type performed by a user. For example, an activity type may include running, jogging, biking, etc. As another example, the data may relate to visited websites, words or emojis used by a user, deep links, preferences, data from a questionnaire, or any other data that a user may want or request to remain private. In one embodiment, the user data can be any form of information that is finite and from a known set. For example, the known set may include a predefined set of possible values known by the server 130.

A server 130 can accumulate privatized user data 112 and determine statistical properties such as a user data frequency estimation 131 amongst a set of client devices 110. As described, the server 130 may be able to learn from the aggregation of the crowdsourced data, but cannot learn the user data provided by any particular client device 110. The server 130 can be any kind of server or a cluster of servers and may include a cloud-based server, application server, backend server, or combination thereof.

Figure 2:
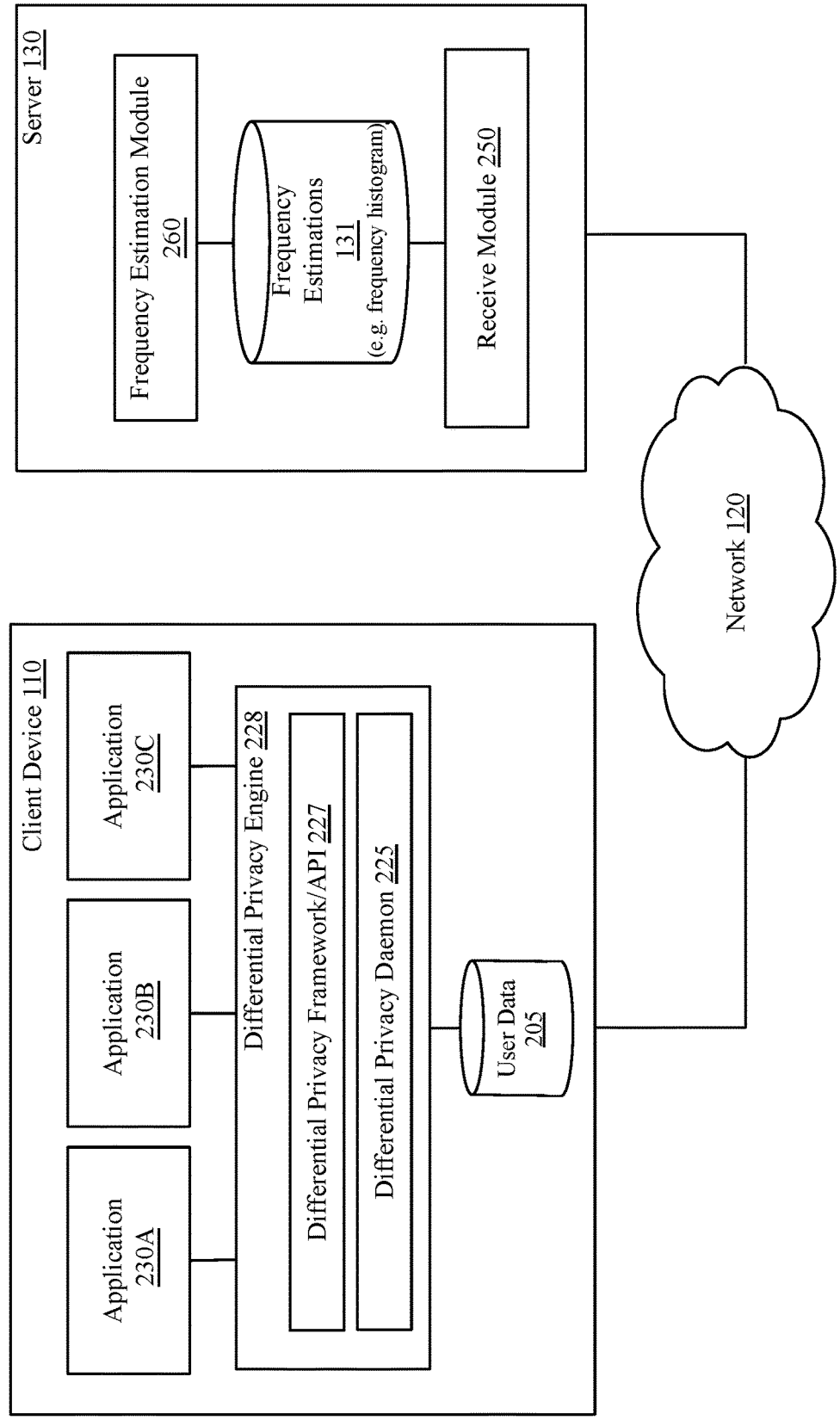
FIG. 2 is a block diagram of systems used for differentially privatizing user data according an embodiment of the disclosure.

FIG. 2 is a block diagram of systems used for differentially privatizing user data according an embodiment of the disclosure. The client device 110 can include a differential privacy engine (DPE) 228 that, in one embodiment, includes a differential privacy daemon 225 and a differential privacy framework or application programming interface (API) 227, and a plurality of applications 230A-230C. One or more of the applications 230 may create user data 205 and the DPE 228 may use various tools such as an encoding mechanism (e.g. hash functions, or cryptographic hash functions) to privatize the user data 205 using the differential privacy mechanism as further described herein.

In one embodiment, the client device 110 may store information related to an activity type. In another example, the information may relate to whether a user tracks steps, distance, heart rate information, or other activity-related information.

In one embodiment, the user data 205 can be stored on the client device in a differentially private form. This user data 205 in a privatized form can be shared (e.g. subsampled) with the server 130, or can be used for other purposes such as for usage and diagnostic purposes. It should be noted that even when the user data 205 is not shared with a server 130, it can still be stored in a differentially private form.

Server 130 may include a receive module 250, and a frequency estimation module 260 to determine a frequency estimation 131 that can be stored in various data structures such as a frequency histogram. The receive module 250 may asynchronously receive encodings of user data for a large plurality of client devices 110 (e.g. crowdsourced data). Receive module 250 may remove from the received encoding any latent identifiers, such as IP address, meta data, session identifier, or other data that might identify a particular client device 110 that sent the data. The frequency estimation module 260 may periodically process the received privatized user data 205. The frequency estimation module 260 may perform operations related to determining various statistical properties of collected user data. In an embodiment, the frequency estimation module 260 may perform a summation operation to update a frequency histogram as further described herein.

Figure 3:
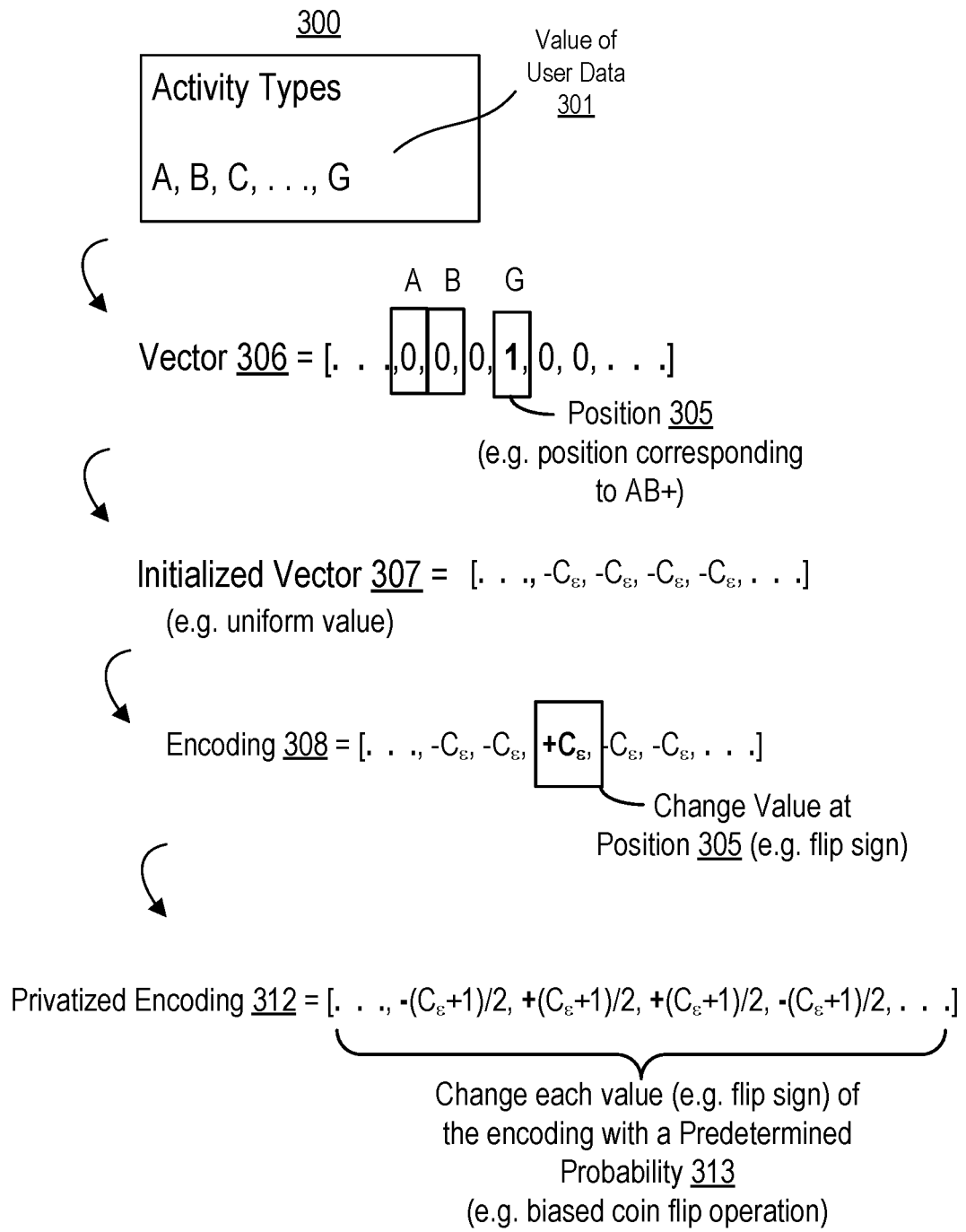
FIG. 3 is an example process flow of differentially privatizing an encoding of user data according to an embodiment of the disclosure.

FIG. 3 is an example process flow of differentially privatizing an encoding of user data to be transmitted to a server according to an embodiment of the disclosure.

As shown in diagram 300, the system (e.g. client device 110) may select a value of user data 301 to be transmitted to the server. The value of user data 301 in this example may correspond to an activity type. The system may encode the value, and as shown, the encoding can be in the form of a vector 306. For example, the vector 306 may have a size of approximately 2000 values and each position of the vector may correspond to a potential value of user data value. It should be noted that a vector is described herein for convenience and mathematical purposes, but any suitable data structure can be implemented such as a string of bits, object, etc.

As shown, the value of user data 301 can correspond to a vector/bit position 305. For example, as shown activity type G may correspond to position 305 while activity types A and B correspond to different positions within the vector.

Accordingly, a vector 306 can be encoded by updating the value (e.g. setting the bit to 1) at position 305. To account for any potential bias of a 0 or null value, the system may use an initialized vector 307. In one embodiment, the initialized vector 307 can be a vector $v \leftarrow [-1]^m \cdot c_\varepsilon$, such that $c_\varepsilon$ adds noise with mean value 0 to the initialized vector. It should be noted that the values are used as mathematical terms, but can be encoded using bits (e.g. $0=+c_\varepsilon$, $1=-c_\varepsilon$). Accordingly, vector 306 may use the initialized vector 307 to create an encoding 308 wherein the value (or bit) at position 305 is changed (or updated). For example, the sign of the value at position 305 can be flipped such that the value is $c_\varepsilon$ (or $+c_\varepsilon$) and all other values remain $-c_\varepsilon$ as shown (or vice versa).

The system may then create a privatized encoding 312 by changing at least some of the values with a predetermined probability 313. In one embodiment, the system may flip the sign (e.g. (−) to (+), or vice versa) of a value with the predetermined probability 313. As further described herein, the predetermined probability may be $1/(1+e^\varepsilon)$.

Accordingly, the value of user data 301 is now represented as a privatized encoding 312, which individually maintains the privacy of the user. This privatized encoding 312 can be stored on the client device 110, or transmitted to the server 130.

As described, the server 130 may accumulate privatized encodings (e.g. vectors) from various client devices. The accumulated encodings may then be processed (in batch or as a data stream) by the server for frequency estimation. In one embodiment, the server may perform a summation operation to determine a sum of the value of user data. In one embodiment, summation operation includes performing a summation operation from all of the vectors received by the client devices.

FIG. 4 is an example flow diagram illustrating a method of differentially privatizing an encoding using a multibit histogram model according to an embodiment of the disclosure. Process 400 may use processing logic, which may include software, hardware, or a combination thereof. For example, process 400 can be performed by a system (e.g. client device 110).

In 401, the system may select a value of user data (e.g. value of user data 301) to transmit to a server amongst a set of possible user data values collected on a client device. The selected value of user data can represent information related to one or more device features used by a user associated with the client device. In one embodiment, the value of user data represents health data for the user that has been collected by the user device with the consent of the user.

In 402, the system may encode the selected value using a vector of bit values. For example, the encoding may include updating the bit value at a bit position corresponding to the value of user data. In one embodiment, updating the bit value may include changing the sign of the value. In one embodiment, the encoding may include initializing the vector $v\leftarrow[-1]^m\times c_\varepsilon$, where m is a range of possible user data values, and constant $$c_\varepsilon \leftarrow \frac{e^\varepsilon + 1}{e^\varepsilon - 1},$$

and wherein updating v[d] includes flipping a sign of v[d].

In 403, the system may differentially privatize the vector by changing at least some of the bit values of the vector with a predefined probability. For example, differentially privatizing the vector may include changing at least some of the bit values with the predefined probability of $1/(1+e^\varepsilon)$, where ε is a privacy parameter.

In 404, the system may transmit the privatized vector to the server to allow the server to perform a summation operation with the privatized vector to estimate a frequency of the value of user data amongst a set of different client devices. The summation operation performed by the server may include determining a frequency of each of the possible user data values amongst the set of different client devices. As described, the sum of a particular user value can be a Gaussian distribution.

Figure 5:
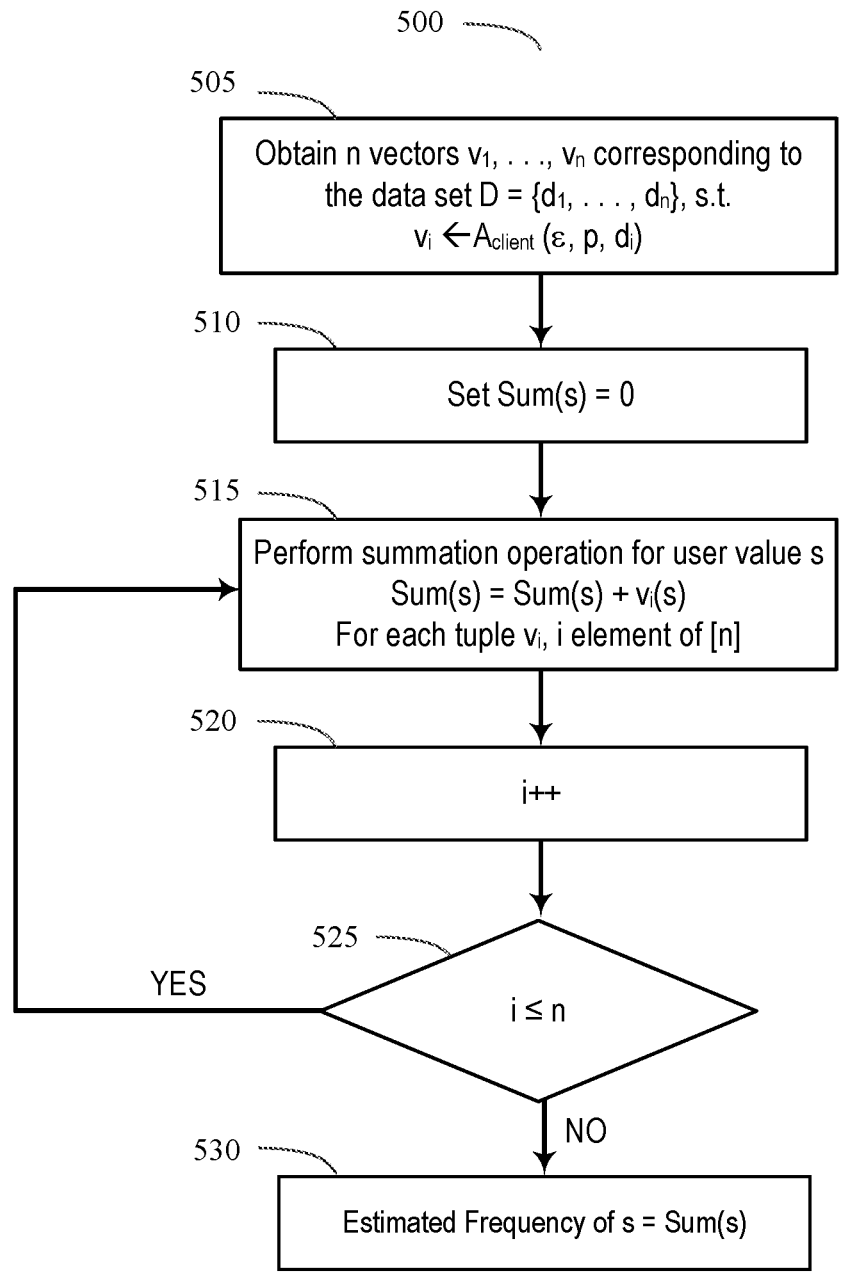
FIG. 5 is an example flow diagram of performing a summation operation of received privatized encodings according to an embodiment of the disclosure.

FIG. 5 is an example flow diagram of performing a summation operation of received privatized encodings according to an embodiment of the disclosure. Process 500 may use processing logic, which may include software, hardware, or a combination thereof. For example, process 500 can be performed by a system (e.g. server 130). In operation 505, the system may obtain n vectors $v_1, \ldots, v_n$ corresponding to the data set $D=\{d_1, \ldots, d_n\}$ such that vector $v_i$ includes the tuple $(\varepsilon, p, d_i)$ from a client device. In operation 805, the system may set the sum for a value of user data s equal to 0 (e.g. reset the summation value). In operation 515, the system, for each of the n vectors, may perform a summation operation to determine the sum of the value of user data s. In one embodiment, the summation operation may include $Sum(s)=Sum(s)+v_i(s)$, for each tuple $v_i$, wherein i is an element of [n]. In operation 520, the system can increment a counter and, in operation 525, determine if all of the vectors have been summed. If not, operations 515 and 520 can be repeated. Once all of the vectors have been summed, in operation 530, the system can determine an estimated frequency of the value of user data s based on the calculated sum.

Figure 6:
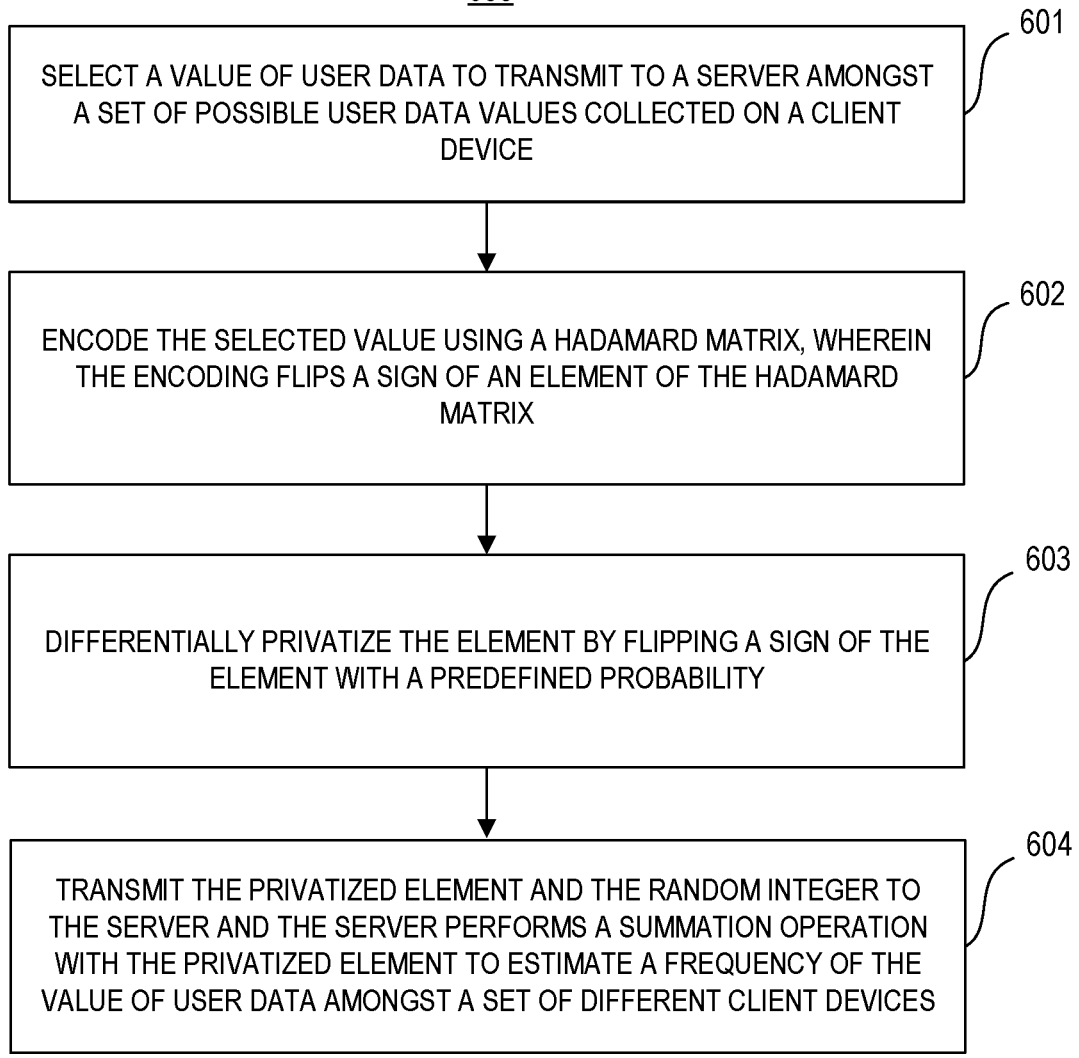
FIG. 6 is an example flow diagram illustrating a method of differentially privatizing an encoding using a Hadamard multibit model according to an embodiment of the disclosure.

FIG. 6 is an example flow diagram illustrating a process 600 of differentially privatizing an encoding using a Hadamard multibit model according to an embodiment of the disclosure. Process 600 may use processing logic, which may include software, hardware, or a combination thereof. For example, process 600 can be performed by a system (e.g. client device 110).

In operation 601, the system may select a value of user data (e.g. value of user data 301) to transmit to a server amongst a set of possible user data values collected on a client device. In one embodiment, the set of possible user data values can be indexed as a set $[p]=\{1, \ldots, p\}$, where the value of user data $d\in[p]$, the Hadamard matrix is a $p\times p$ matrix H, and the element is $u\leftarrow H(d,j)$, where j is the random integer selected from a set $\{0, \ldots, p-1\}$.

In operation 602, the system may encode the selected value using a Hadamard matrix. For example, the encoding may include flipping the sign of an element of the Hadamard matrix.

In operation 603, the system may differentially privatize the element by flipping a sign of the element with a predefined probability. For example, differentially privatizing the element may include flipping the sign of the element with the predefined probability of $1/(1+e^\varepsilon)$, where ε is a privacy parameter. In addition, in one embodiment, differentially privatizing the element u may include an operation $u_{priv}=c_\varepsilon\times\sqrt{p}\times u$, where constant $$c_\varepsilon \leftarrow \frac{e^\varepsilon + 1}{e^\varepsilon - 1}.$$

In operation 604, the system may transmit the privatized element and the random integer to the server to allow the server to perform a summation operation with the privatized element to estimate a frequency of the value of user data amongst a set of different client devices. The summation operation performed by the server may include determining a frequency of each of the possible user data values amongst the set of different client devices. As described, the sum of a particular user value may be a Gaussian distribution.

It should be noted that there may be variations to the flow diagrams or the steps (or operations) described therein without departing from the embodiments described herein. For instance, the steps can be performed in parallel, simultaneously, a differing order, or steps can be added, deleted, or modified.

Figure 7A:
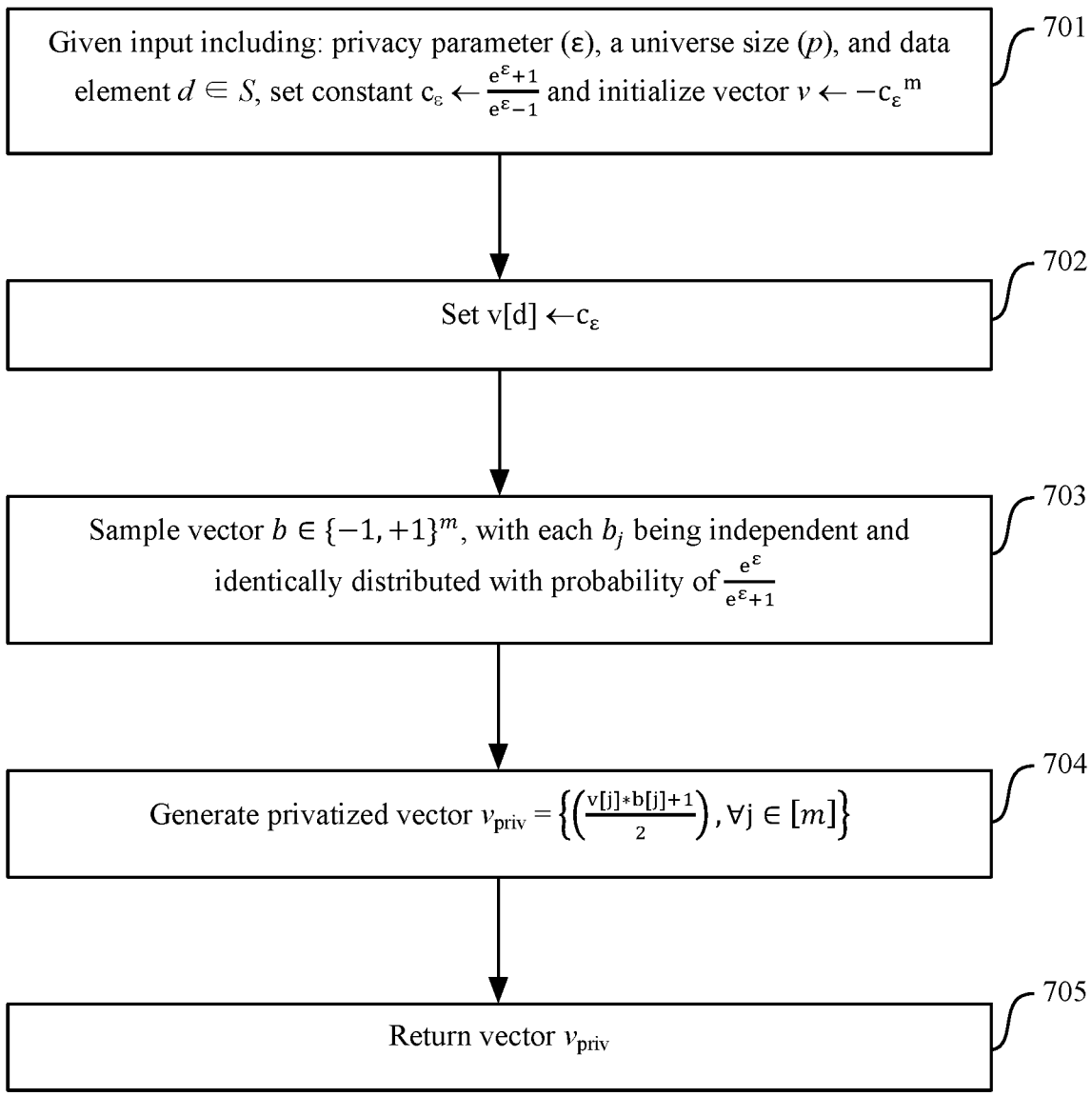
FIGS. 7A-7B are a block diagram of a multibit histogram model of client and server algorithms according to an embodiment.
Figure 7B:
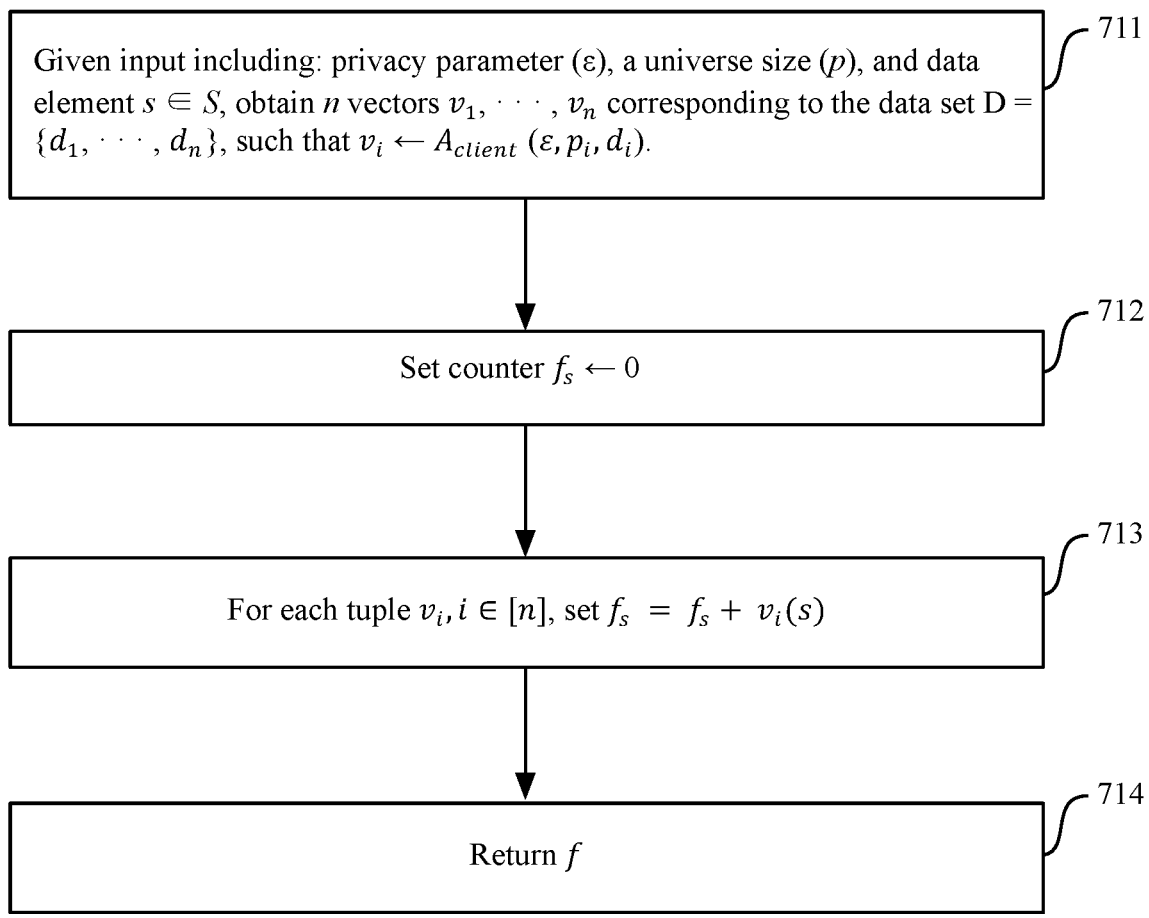

FIGS. 7A-7B are a block diagram of a multibit histogram model of client and server algorithms according to an embodiment. FIG. 7A shows an algorithmic representation of the client side process 700 of the multibit histogram model as described herein. FIG. 7B shows an algorithmic representation of the server side process 710 of the multibit histogram model as described herein. The client-side process 700 and server side process 710 can use the multibit histogram model to enable privacy of crowdsourced data while maintaining the utility of the data. Client-side process 700 (e.g., $A_{client}$), can initialize vector $v \leftarrow [-1]m \times c_\varepsilon$, where $$c_\varepsilon = \frac{e^\varepsilon + 1}{e^\varepsilon - 1}.$$

Where the user is to transmit $d \in [p]$, client-side process 700 can be applied to flip the sign of $v[d]$. To ensure differential privacy, client-side process 700 can flip the sign of each entry v with a probability of $1/(1+e^\varepsilon)$.

As shown FIG. 7A, client-side process 700, given input including a privacy parameter ($\varepsilon$), a universe size (p), and data element $d \in S$, the algorithm can set a constant $$c_\varepsilon \leftarrow \frac{e^\varepsilon + 1}{e^\varepsilon - 1}$$

and initialize vector $v \leftarrow -c_\varepsilon^m$, as shown in block 701. Constant $c_\varepsilon$ allows the noise added to maintain privacy at mean zero to remain unbiased. As shown at block 702 client-side process 700 can then set $v[d] \leftarrow c_\varepsilon$ and, at block 703, sample vector $b \in \{-1,+1\}^m$, with each $b_j$ being independent and identically distributed with probability of $$\frac{e^\varepsilon}{e^\varepsilon + 1}.$$

As shown at block 704, client-side algorithm 700 can then generate a privatized vector $$v_{priv} = \left\{ \left( \frac{v[j] * b[j] + 1}{2} \right), \forall j \in [m] \right\}.$$

At block 705, client-side algorithm 700 can return vector $v_{priv}$, which is a privatized version of vector v.

As shown in FIG. 7B, server-side process 710 aggregates the client-side vectors and, given input including privacy parameter ($\varepsilon$), universe size (p), and data element $s \in S$, whose frequency is to be estimated, can return an estimated frequency based on aggregated data received from crowd-sourcing client devices. As shown at block 711, server-side process 710 (e.g., $A_{server}$), can obtain n vectors $v_1, \ldots, v_n$ corresponding to the data set $D = \{d_1, \ldots, d_n\}$, such that $v_i \leftarrow A_{client}(\varepsilon, p_i, d_i)$. At block 712, server-side process 710 can initialize a counter $f_s$ (e.g., $f_s \leftarrow 0$). Server-side process 710, for each tuple $v_i$, $i \in [n]$, can set $f_s = f_s + v_i(s)$, as shown at block 713. At block 714, server-side process 710 can return f, which is a frequency of the value of user data amongst the aggregate data set.

Client-side process 700 and server-side process 710 provide privacy and utility. Client-side process 700 and server-side process 710 are jointly locally differentially private. Client-side process 700 $\varepsilon$-locally differentially private, and server-side process 710 does not access raw data. For arbitrary output $v \in \{-c_\varepsilon, c_\varepsilon\}^p$, the probability of observing the output is similar whether the user is present or not. For example, in the case of an absent user, the output of $A_{client}(\varepsilon, p_i, \varphi)$ can be considered, where $\varphi$ is the null element. By the independence of each bit flip, $$\frac{Pr[A_{client}(\varepsilon, p_i, d) = v]}{Pr[A_{client}(\varepsilon, p_i, \varphi) = v]} \leq e^\varepsilon$$

Similarly, $$\frac{Pr[A_{client}(\varepsilon, p_i, d) = v]}{Pr[A_{client}(\varepsilon, p_i, \varphi) = v]} \geq e^{-\varepsilon}$$

Server-side process 710 also has a utility guarantee for frequency estimation. Privacy and utility are generally tradeoffs for differential privacy algorithms. For a differential privacy algorithm to achieve maximal privacy, the output of the algorithm may not be a useful approximation of the actual data. For the algorithm to achieve maximal utility, the output may not be sufficiently private. The multibit histogram model described herein achieves c-local differential privacy while achieving optimal utility asymptotically.

The utility guarantee for server-side process 710 be stated as follows: Let $\varepsilon > 0$ and $s \in S$ be an arbitrary element in the universe. Let $f_s$ be the output of server-side process 710 (e.g., $A_{server}(\varepsilon, p, s)$) and $X_s$ be the true frequency of s. Then, for any $b > 0$, $$Pr\left[|f_s - X_s| > |b\sigma\sqrt{n}|\right] < 1 - erf(b/\sqrt{2}) + \frac{1.12 \cdot \rho}{\sigma^3 \sqrt{n}},$$

$$\text{where } c_\varepsilon = \frac{e^\varepsilon + 1}{e^\varepsilon - 1}, \sigma = \sqrt{\frac{c_\varepsilon^2 - 1}{4}}, \text{ and } \rho = \frac{c_\varepsilon^3 - 1/c_\varepsilon}{8}.$$

Figure 8A:
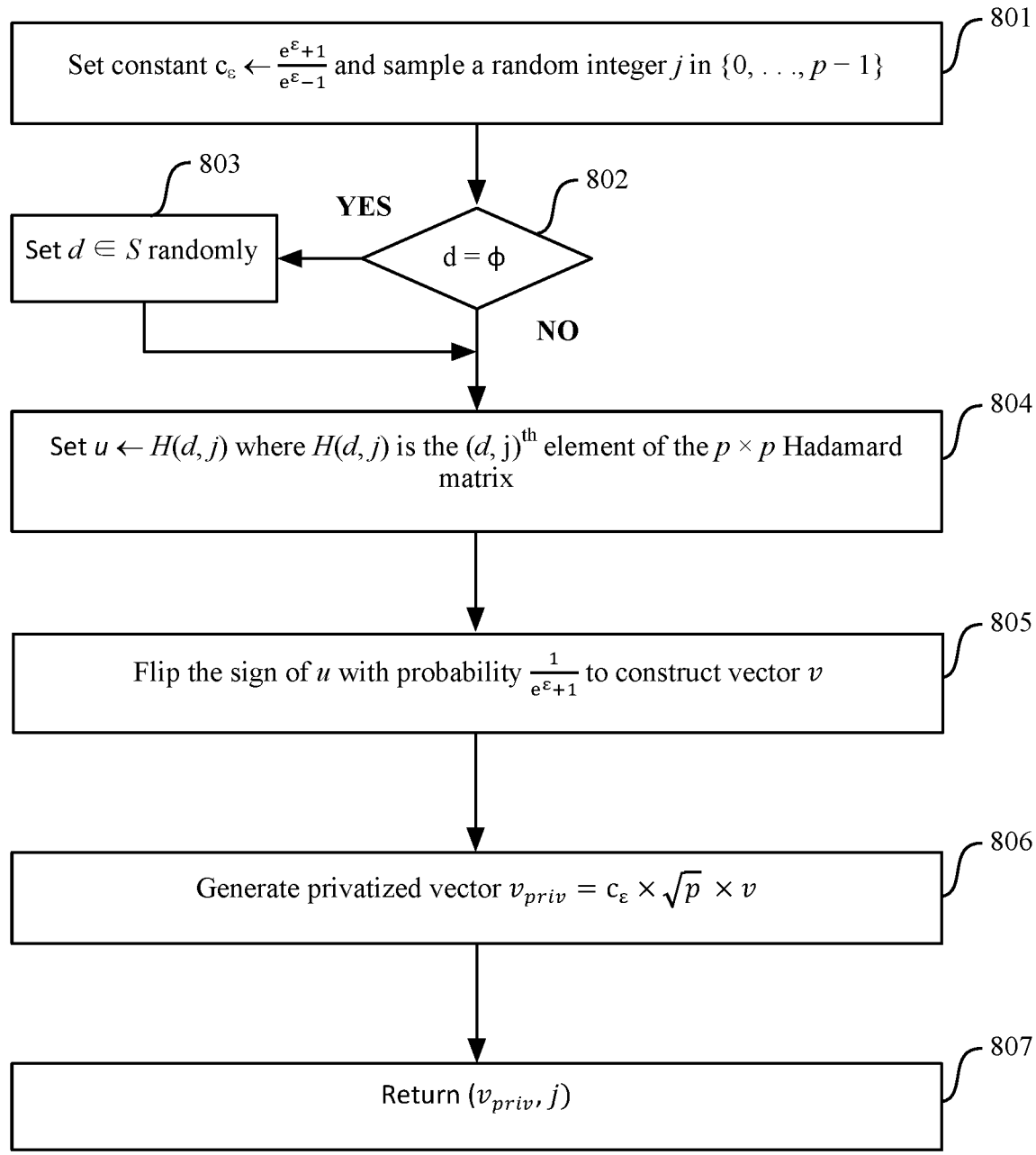
FIGS. 8A-8B are block diagrams of a Hadamard multibit model of client and server algorithms according to an embodiment.
Figure 8B:
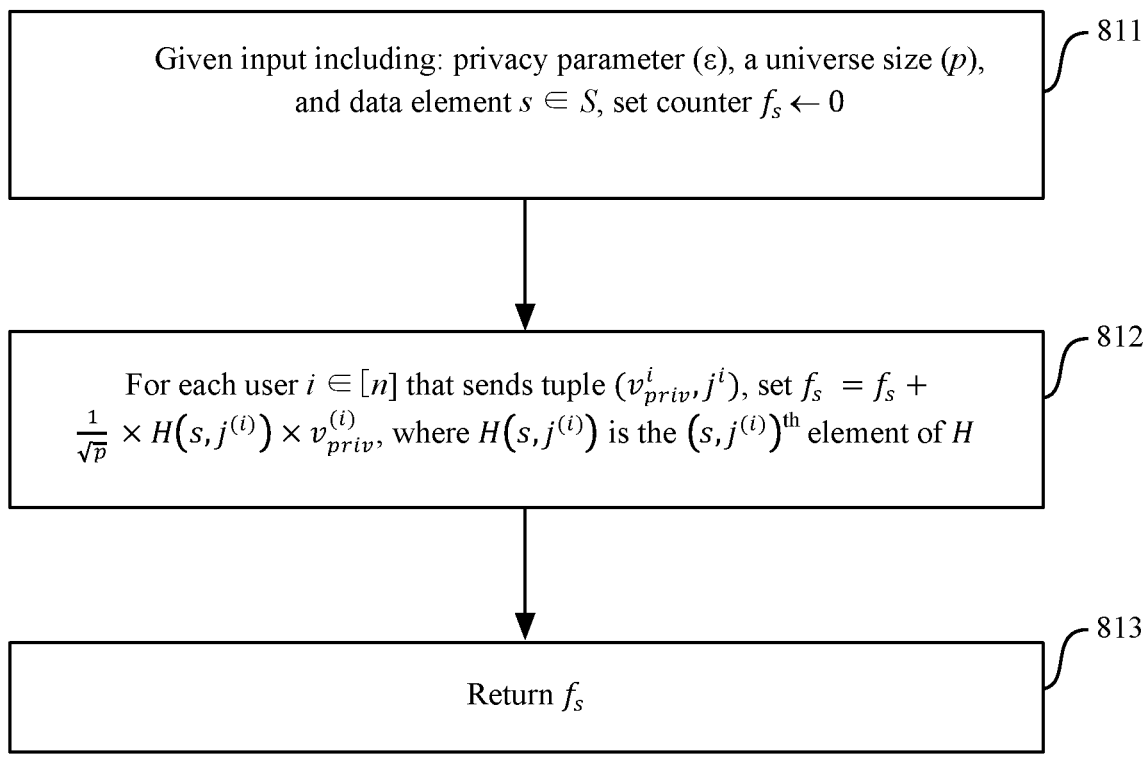

FIGS. 8A-8B are block diagrams of a Hadamard multibit model of client and server algorithms according to an embodiment. The Hadamard multibit model is a variant of the multibit model described herein, which enables local differential privacy while optimizing utility. The Hadamard multibit model makes use of a Hadamard matrix, which is a square matrix with mutually orthogonal rows, each element being +1 or −1. In a Hadamard matrix, placing any two columns or rows side by side gives half the adjacent cells the same sign and half of the adjacent cells the opposite sign.

FIG. 8A illustrates client-side process 800, which performs a client-side algorithm that implements a Hadamard variant of algorithm $A_{client}$ (e.g., $HA_{client}$). Operation of the Hadamard multibit model can be described with reference to an example use case in which a client is to transmit $d \in [p]$.

Let H be a p×p Hadamard matrix. Client-side process 800 can pick a random number j∈{0, 1, . . . , p−1} and set u=H(d,p), which is the element in row d and column p of H. To ensure differential privacy client-side process 800 can flip the sign of u with probability $$\frac{1}{e^\varepsilon + 1}$$

to form v∈{−1,1}. Client-side process 800 then returns $v_{priv}=c_\varepsilon \times \sqrt{p} \times v$ and the index j. It is also possible to not send any element of the universe (e.g., φ). In such a case client-side process 800 randomly picks a d∈S.

In further detail, as shown at block 801, client-side process 800 can set constant $$c_\varepsilon \leftarrow \frac{e^\varepsilon + 1}{e^\varepsilon - 1}$$

and sample a random integer j in {0, . . . , p−1}. If at block 802, d=φ, then the client-side process 800 can set d∈S randomly at block 803. At block 804, client-side process 800 can set u←H(d,j) where H(d,j) is the (d,j)$^{th}$ element of the p×p Hadamard matrix. At block 805, client-side process 800 can flip the sign of u with probability $$\frac{1}{e^\varepsilon + 1}$$

to construct vector v. At block 806, the client-side process 800 can generate a privatized vector $v_{priv}=c_\varepsilon \times \sqrt{p} \times v$. At block 807, client-side process 800 can return privatized vector $v_{priv}$ and index j.

FIG. 8B illustrates server-side process 810, which implements Hadamard variant of a server-side algorithm $A_{server}$ (e.g., $HA_{server}$) Server-side process 810 receives the universe element s∈S whose frequency is to be determined. Server-side process 810 can initialize a counter $f_s=0$ and receive an ordered pair $(v_{priv}^i, j^i)$. For each user i, server-side process 810 can increment $$f_s \text{ by } \frac{1}{\sqrt{p}} \times H(s, j^{(i)}) \times v_{priv}^{(i)},$$

where $H(s,j^{(i)})$ is the $(s,j^{(i)})^{th}$ element of H.

In further detail, as shown at block 811, given input including privacy parameter (ε), universe size (p), and data element s∈S, whose frequency is to be estimated, server-side process 810 can set counter $f_s \leftarrow 0$. At block 812, for each user i∈[n] that sends tuple $(v_{priv}^i, j^i)$, server-side process 810 can set $$f_s = f_s + \frac{1}{\sqrt{p}} \times H(s, j^{(i)}) \times v_{priv}^{(i)}, \text{ where } H(s, j^{(i)})$$

is the $(s,j^{(i)})^{th}$ element of H. At block 813, server-side process 810 can return $f_s$.

Client-side process 800 and server-side process 810 provide privacy and utility for similar reasons as client-side process 700 and server-side process 710. The privacy guarantee for client-side process 800 is similar to that of client-side process 700, in that in the case of an absent user, the output of $A_{client}(\varepsilon, p_i, \varphi)$ can be considered, where is the null element. By the independence of each bit flip, $$\frac{Pr[A_{client}(\varepsilon, p_i, d) = v]}{Pr[A_{client}(\varepsilon, p_i, \varphi) = v]} \leq e^\varepsilon$$

Similarly, $$\frac{Pr[A_{client}(\varepsilon, p_i, d) = v]}{Pr[A_{client}(\varepsilon, p_i, \varphi) = v]} \geq e^{-\varepsilon}$$

The utility guarantee for server-side process 810 be stated as follows: Let ε>0 and s ∈S be an arbitrary element in the universe. Let $f_s$ be the output of server-side process 810 (e.g., $HA_{server}(\varepsilon, p, s))$ and $X_s$ be the true frequency of s. Then, for any b>0, $$Pr\left[|f_s - X_s| > |b\sigma\sqrt{n}|\right] < 1 - erf(b/\sqrt{2}) + \frac{1.12 \cdot \rho}{\sigma^3 \sqrt{n}},$$

where $$c_\varepsilon = \frac{e^\varepsilon + 1}{e^\varepsilon - 1}, \sigma = c_\varepsilon$$

and $\rho = c_\varepsilon^3$. It should be noted that the values of σ and ρ of the utility guarantee of sever-side process 810 differs from that of server-side process 710.

Exemplary Application Programming Interface Diagrams

Embodiments described herein include one or more application programming interfaces (APIs) in an environment in which calling program code interacts with other program code that is called through one or more programming interfaces. Various function calls, messages, or other types of invocations, which further may include various kinds of parameters, can be transferred via the APIs between the calling program and the code being called. In addition, an API may provide the calling program code the ability to use data types or classes defined in the API and implemented in the called program code.

An API allows a developer of an API-calling component (which may be a third-party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments an application or other client program may use an API provided by an Application Framework. In these embodiments the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one embedment, call APIs from different providers such as a set of APIs from an OS provider and another set of APIs from a plug-in provider and another set of APIs from another provider (e.g. the provider of a software library) or creator of the another set of APIs.

Figure 9:
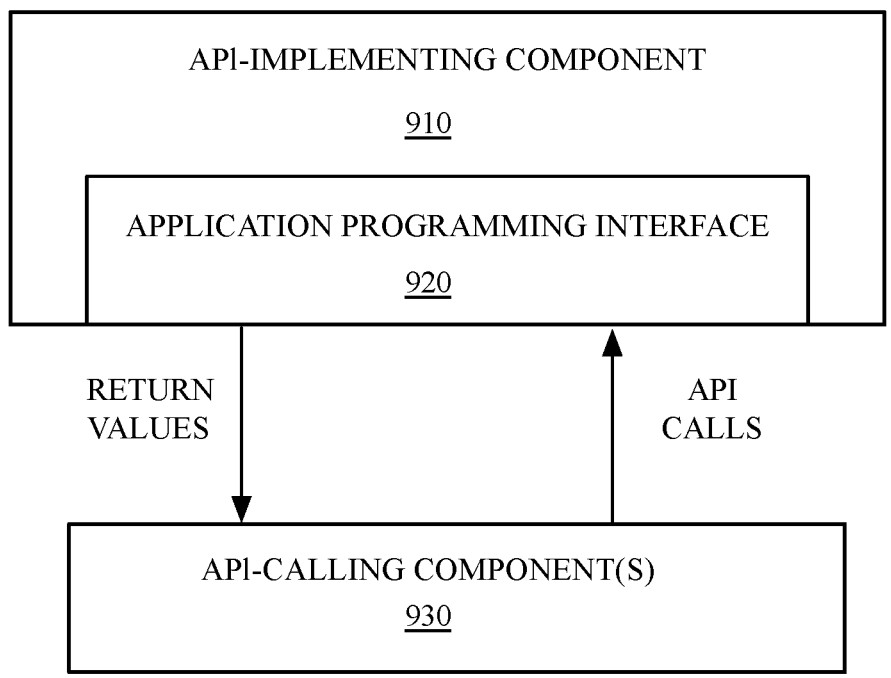
FIG. 9 is a block diagram illustrating an exemplary API architecture, which may be used in some embodiments.

FIG. 9 is a block diagram illustrating an exemplary API architecture, which may be used in some embodiments described herein. The API architecture 900 includes the API-implementing component 910 (e.g., an operating system, a library, a device driver, an API, an application program, software or other module) that implements the API 920. The API 920 specifies one or more functions, methods, classes, objects, protocols, data structures, formats and/or other features of the API-implementing component that may be used by the API-calling component 930. The API 920 can specify at least one calling convention that specifies how a function in the API-implementing component receives parameters from the API-calling component and how the function returns a result to the API-calling component. The API-calling component 930 (e.g., an operating system, a library, a device driver, an API, an application program, software or other module), makes API calls through the API 920 to access and use the features of the API-implementing component 910 that are specified by the API 920. The API-implementing component 910 may return a value through the API 920 to the API-calling component 930 in response to an API call.

It will be appreciated that the API-implementing component 910 may include additional functions, methods, classes, data structures, and/or other features that are not specified through the API 920 and are not available to the API-calling component 930. It should be understood that the API-calling component 930 may be on the same system as the API-implementing component 910 or may be located remotely and accesses the API-implementing component 910 using the API 920 over a network. While FIG. 9 illustrates a single API-calling component 930 interacting with the API 920, it should be understood that other API-calling components, which may be written in different languages (or the same language) than the API-calling component 930, may use the API 920.

The API-implementing component 910, the API 920, and the API-calling component 930 may be stored in a machine-readable medium, which includes any mechanism for storing information in a form readable by a machine (e.g., a computer or other data processing system). For example, a machine-readable medium includes magnetic disks, optical disks, random access memory; read only memory, flash memory devices, etc.

Figure 10A:
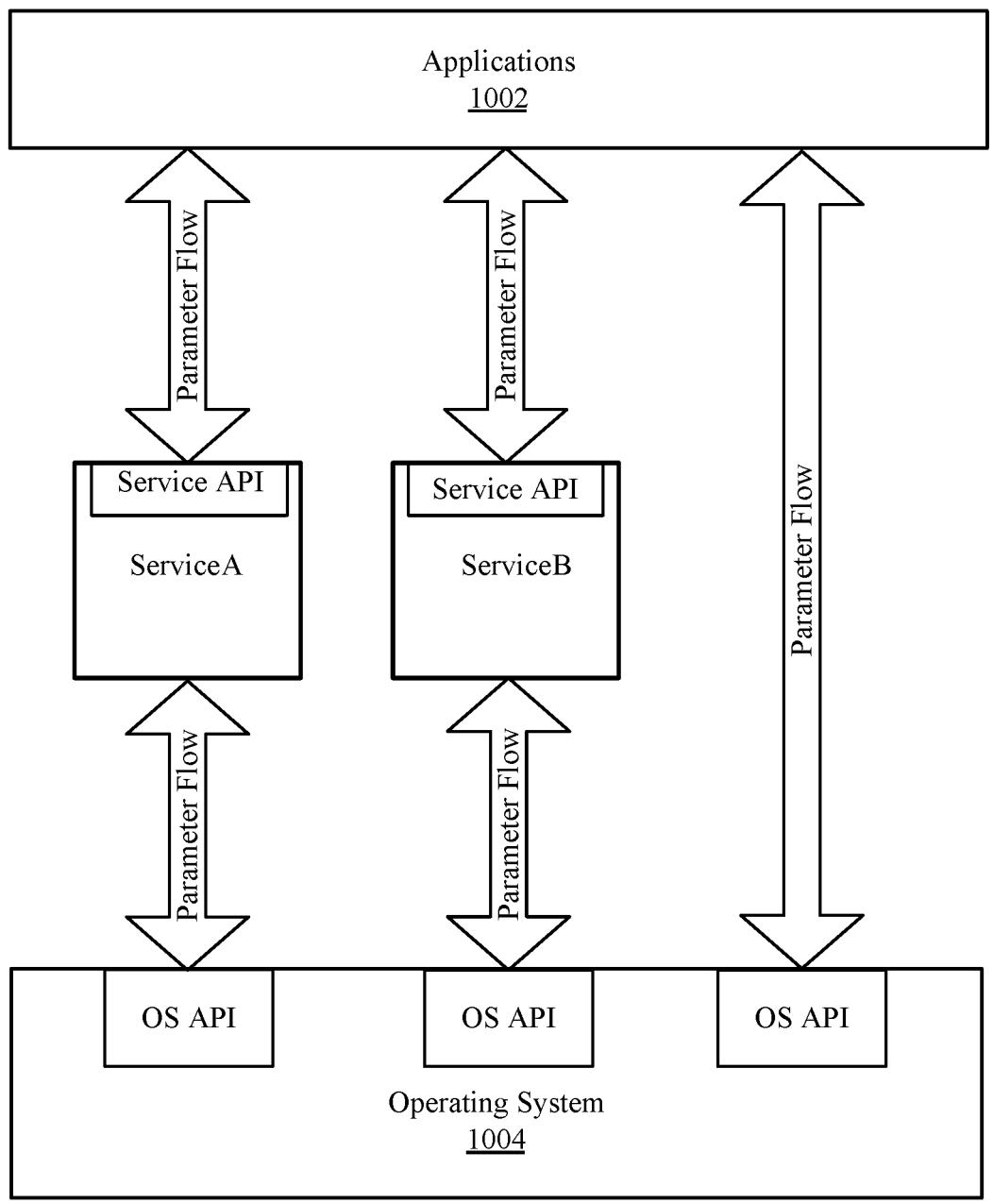
FIG. 10A-10B are block diagrams of exemplary API software stacks, according to embodiments.
Figure 10B:
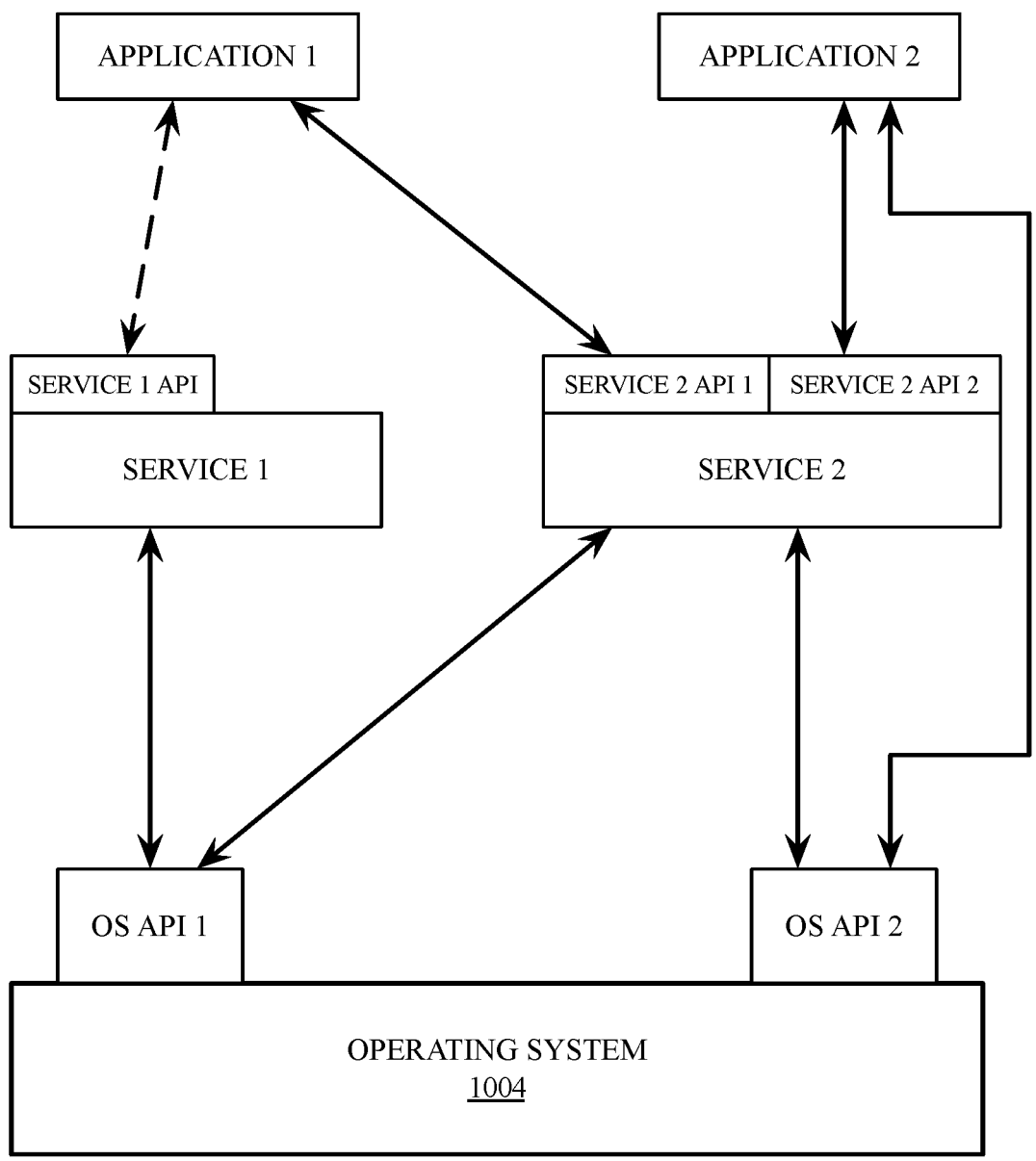

FIGS. 10A-10B are block diagrams of exemplary API software stacks 1000, 1010, according to embodiments. FIG. 10A shows an exemplary API software stack 1000 in which applications 1002 can make calls to Service A or Service B using Service API and to Operating System 1004 using an OS API. Additionally, Service A and Service B can make calls to Operating System 1004 using several OS APIs.

FIG. 10B shows an exemplary software stack 1010 including Application 1, Application 2, Service 1, Service 2, and Operating System 1004. As illustrated, Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Additional Exemplary Computing Devices

Figure 11:
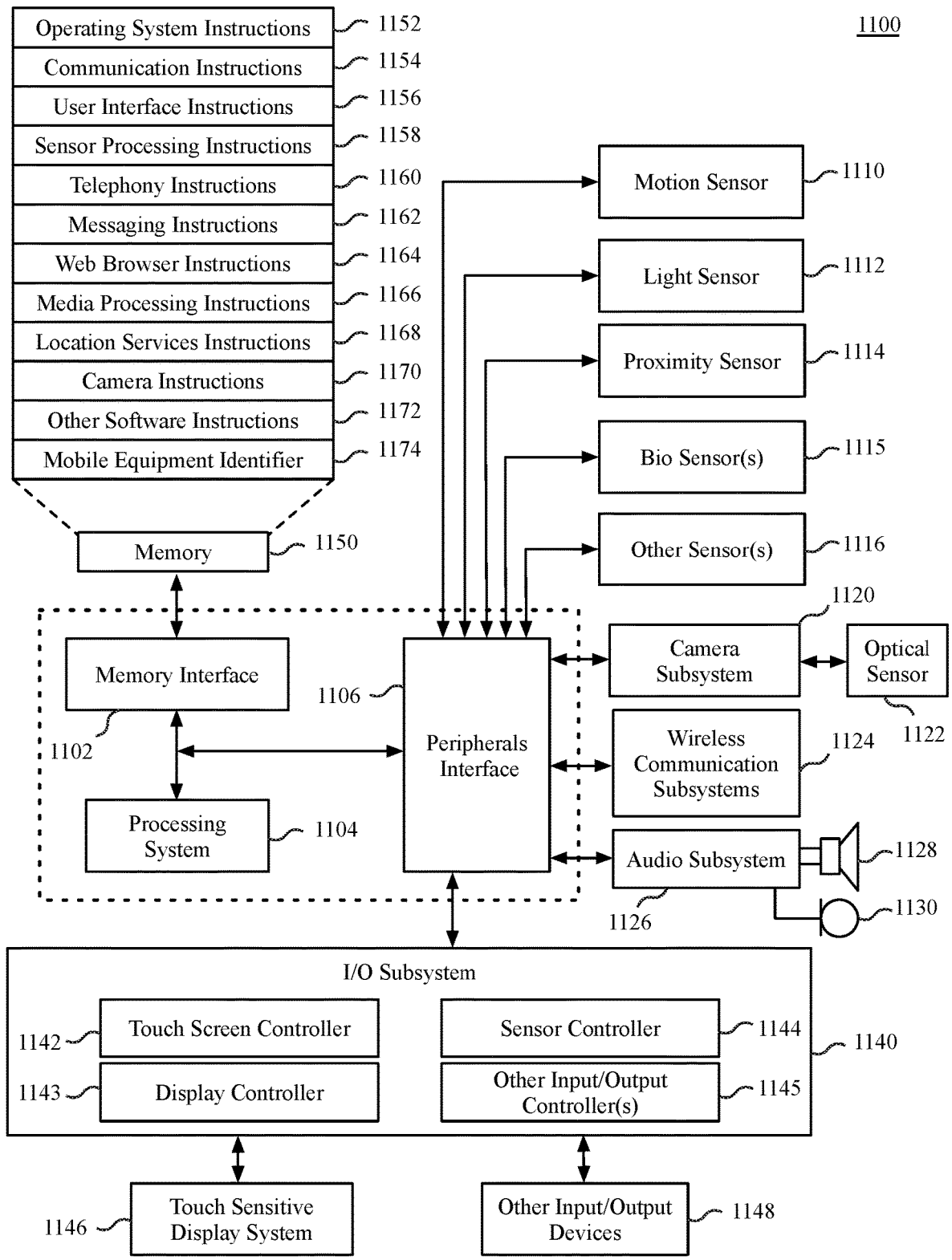
FIG. 11 is a block diagram of mobile device architecture, according to an embodiment.

FIG. 11 is a block diagram of a device architecture 1100 for a mobile or embedded device, according to an embodiment. The device architecture 1100 includes a memory interface 1102, a processing system 1104 including one or more data processors, image processors and/or graphics processing units, and a peripherals interface 1106. The various components can be coupled by one or more communication buses or signal lines. The various components can be separate logical components or devices or can be integrated in one or more integrated circuits, such as in a system on a chip integrated circuit.

The memory interface 1102 can be coupled to memory 1150, which can include high-speed random access memory such as static random access memory (SRAM) or dynamic random access memory (DRAM) and/or non-volatile memory, such as but not limited to flash memory (e.g., NAND flash, NOR flash, etc.).

Sensors, devices, and subsystems can be coupled to the peripherals interface 1106 to facilitate multiple functionalities. For example, a motion sensor 1110, a light sensor 1112, and a proximity sensor 1114 can be coupled to the peripherals interface 1106 to facilitate the mobile device functionality. One or more biometric sensor(s) 1115 may also be present, such as a fingerprint scanner for fingerprint recognition or an image sensor for facial recognition. Other sensors 1116 can also be connected to the peripherals interface 1106, such as a positioning system (e.g., GPS receiver), a temperature sensor, or other sensing device, to facilitate related functionalities. A camera subsystem 1120 and an optical sensor 1122, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1124, which can include radio frequency receivers and transmitters and/or optical (e.g., infrared) receivers and transmitters. The specific design and implementation of the wireless communication subsystems 1124 can depend on the communication network(s) over which a mobile device is intended to operate. For example, a mobile device including the illustrated device architecture 1100 can include wireless communication subsystems 1124 designed to operate over a GSM network, a CDMA network, an LTE network, a Wi-Fi network, a Bluetooth network, or any other wireless network. In particular, the wireless communication subsystems 1124 can provide a communications mechanism over which a media playback application can retrieve resources from a remote media server or scheduled events from a remote calendar or event server.

An audio subsystem 1126 can be coupled to a speaker 1128 and a microphone 1130 to facilitate voice-enabled functions, such as voice recognition, voice replication, digital recording, and telephony functions. In smart media devices described herein, the audio subsystem 1126 can be a high-quality audio system including support for virtual surround sound.

The I/O subsystem 1140 can include a touch screen controller 1142 and/or other input controller(s) 1145. For computing devices including a display device, the touch screen controller 1142 can be coupled to a touch sensitive display system 1146 (e.g., touch-screen). The touch sensitive display system 1146 and touch screen controller 1142 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 1146. Display output for the touch sensitive display system 1146 can be generated by a display controller 1143. In one embodiment the display controller 1143 can provide frame data to the touch sensitive display system 1146 at a variable frame rate.

In one embodiment a sensor controller 1144 is included to monitor, control, and/or processes data received from one or more of the motion sensor 1110, light sensor 1112, proximity sensor 1114, or other sensors 1116. The sensor controller 1144 can include logic to interpret sensor data to determine the occurrence of one of more motion events or activities by analysis of the sensor data from the sensors.

In one embodiment the I/O subsystem 1140 includes other input controller(s) 1145 that can be coupled to other input/control devices 1148, such as one or more buttons, rocker switches, thumb-wheel, infrared port, USB port, and/or a pointer device such as a stylus, or control devices such as an up/down button for volume control of the speaker 1128 and/or the microphone 1130.

In one embodiment, the memory 1150 coupled to the memory interface 1102 can store instructions for an operating system 1152, including portable operating system interface (POSIX) compliant and non-compliant operating system or an embedded operating system. The operating system 1152 may include instructions for handling basic system services and for performing hardware dependent tasks. In some implementations, the operating system 1152 can be a kernel.

The memory 1150 can also store communication instructions 1154 to facilitate communicating with one or more additional devices, one or more computers and/or one or more servers, for example, to retrieve web resources from remote web servers. The memory 1150 can also include user interface instructions 1156, including graphical user interface instructions to facilitate graphic user interface processing.

Additionally, the memory 1150 can store sensor processing instructions 1158 to facilitate sensor-related processing and functions; telephony instructions 1160 to facilitate telephone-related processes and functions; messaging instructions 1162 to facilitate electronic-messaging related processes and functions; web browser instructions 1164 to facilitate web browsing-related processes and functions; media processing instructions 1166 to facilitate media processing-related processes and functions; location services instructions including GPS and/or navigation instructions 1168 and Wi-Fi based location instructions to facilitate location based functionality; camera instructions 1170 to facilitate camera-related processes and functions; and/or other software instructions 1172 to facilitate other processes and functions, e.g., security processes and functions, and processes and functions related to the systems. The memory 1150 may also store other software instructions such as web video instructions to facilitate web video-related processes and functions; and/or web shopping instructions to facilitate web shopping-related processes and functions. In some implementations, the media processing instructions 1166 are divided into audio processing instructions and video processing instructions to facilitate audio processing-related processes and functions and video processing-related processes and functions, respectively. A mobile equipment identifier, such as an International Mobile Equipment Identity (IMEI) 1174 or a similar hardware identifier can also be stored in memory 1150.

Each of the above identified instructions and applications can correspond to a set of instructions for performing one or more functions described above. These instructions need not be implemented as separate software programs, procedures, or modules. The memory 1150 can include additional instructions or fewer instructions. Furthermore, various functions may be implemented in hardware and/or in software, including in one or more signal processing and/or application specific integrated circuits.

Figure 12:
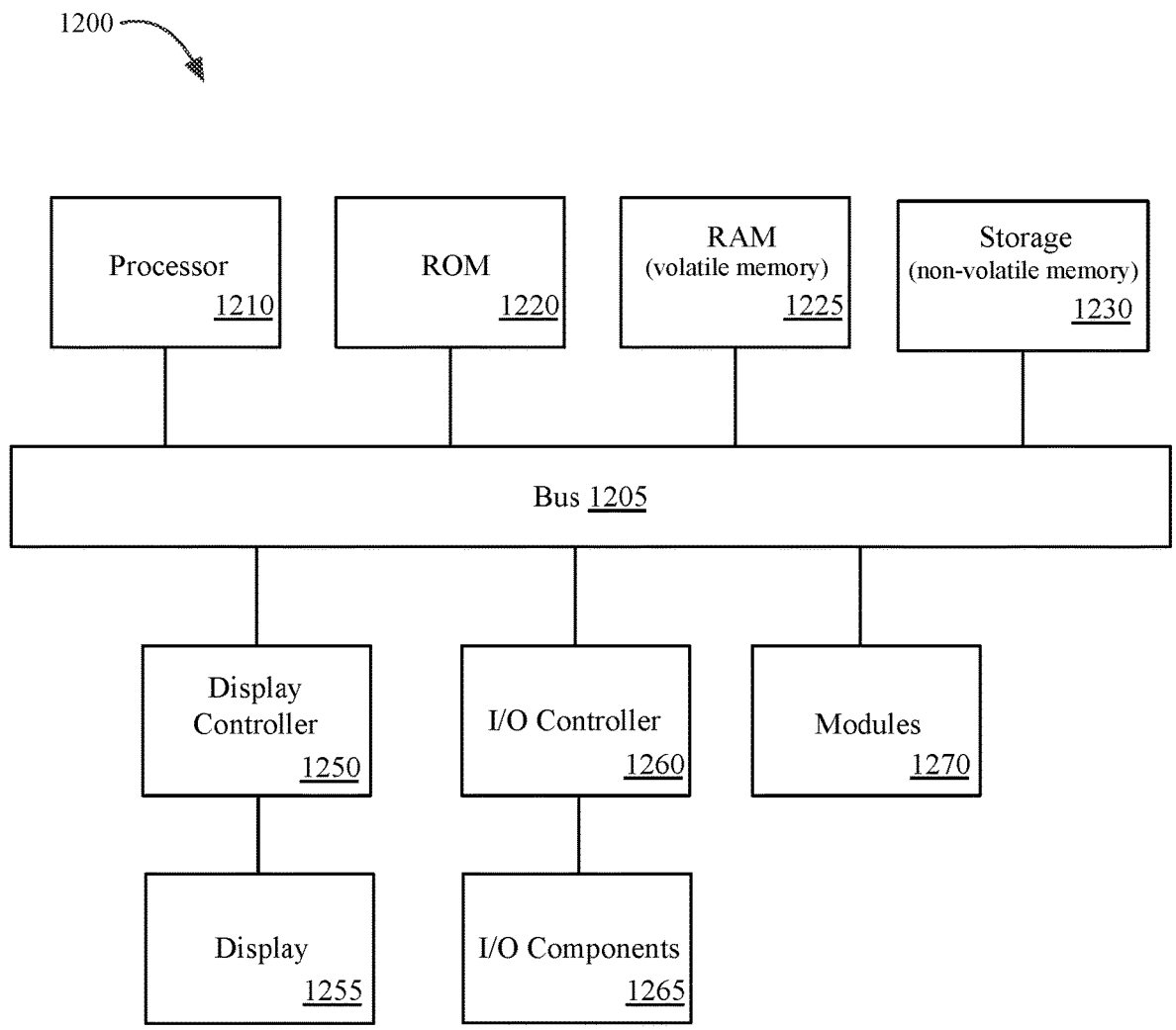
FIG. 12 is a block diagram illustrating an example computing system that can be used in conjunction with one or more of the embodiments of the disclosure.

FIG. 12 is a block diagram illustrating a computing system 1200 that can be used in conjunction with one or more of the embodiments described herein. The illustrated computing system 1200 can represent any of the devices or systems (e.g. client device 110, server 130) described herein that perform any of the processes, operations, or methods of the disclosure. Note that while the computing system illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 1200 can include a bus 1205 which can be coupled to a processor 1210, ROM (Read Only Memory) 1220, RAM (or volatile memory) 1225, and storage (or non-volatile memory) 1230. The processor 1210 can retrieve stored instructions from one or more of the memories 1220, 1225, and 1230 and execute the instructions to perform processes, operations, or methods described herein. These memories represent examples of a non-transitory machine-readable medium (or computer-readable medium) or storage containing instructions which when executed by a computing system (or a processor), cause the computing system (or processor) to perform operations, processes, or methods described herein. The RAM 1225 can be implemented as, for example, dynamic RAM (DRAM), or other types of memory that require power continually in order to refresh or maintain the data in the memory. Storage 1230 can include, for example, magnetic, semiconductor, tape, optical, removable, non-removable, and other types of storage that maintain data even after power is removed from the system. It should be appreciated that storage 1230 can be remote from the system (e.g. accessible via a network).

A display controller 1250 can be coupled to the bus 1205 in order to receive display data to be displayed on a display device 1255, which can display any one of the user interface features or embodiments described herein and can be a local or a remote display device. The computing system 1200 can also include one or more input/output (I/O) components 1265 including mice, keyboards, touch screen, network interfaces, printers, speakers, and other devices. Typically, the input/output components 1265 are coupled to the system through an input/output controller 1260.

Modules 1270 (or components, units, functions, or logic) can represent any of the functions or engines described above, such as, for example, the differential privacy engine 228. Modules 1270 can reside, completely or at least partially, within the memories described above, or within a processor during execution thereof by the computing system. In addition, modules 1270 can be implemented as software, firmware, or functional circuitry within the computing system, or as combinations thereof.

In some embodiments, the hash functions described herein can utilize specialized hardware circuitry (or firmware) of the system (client device or server). For example, the function can be a hardware-accelerated function. In addition, in some embodiments, the system can use a function that is part of a specialized instruction set. For example, the can use an instruction set which may be an extension to an instruction set architecture for particular a type of microprocessors. Accordingly, in an embodiment, the system can provide a hardware-accelerated mechanism for performing SHA operations. Accordingly, the system can improve the speed of performing the functions described herein using these instruction sets.

In addition, the hardware-accelerated engines/functions are contemplated to include any implementations in hardware, firmware, or combination thereof, including various configurations which can include hardware/firmware integrated into the SoC as a separate processor, or included as special purpose CPU (or core), or integrated in a coprocessor on the circuit board, or contained on a chip of an extension circuit board, etc.

Accordingly, although such accelerated functions are not necessarily required to implement differential privacy, some embodiments herein, can leverage the prevalence of specialized support for such functions (e.g. cryptographic functions) to potentially improve the overall efficiency of implementations.

It should be noted that the term "approximately" or "substantially" may be used herein and may be interpreted as "as nearly as practicable," "within technical limitations," and the like. In addition, the use of the term "or" indicates an inclusive or (e.g. and/or) unless otherwise specified.

In the foregoing description, example embodiments of the disclosure have been described. It will be evident that various modifications can be made thereto without departing from the broader spirit and scope of the disclosure. The specification and drawings are, accordingly, to be regarded in an illustrative sense rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally various components described herein can be a means for performing the operations or functions described herein.

It should be noted that the term "approximately" or "substantially" can be used herein and can be interpreted as "as nearly as practicable," "within technical limitations," and the like. In addition, the use of the term "or" indicates an inclusive or (e.g. and/or) unless otherwise specified.

Embodiments described herein apply differential privacy encoding to user data that used to estimate a frequency of such data amongst a set of client devices. Such embodiments provide differential privacy techniques that can be used to reduce resource requirements while providing provable guarantees regarding privacy and utility.

One embodiment provides for a non-transitory machine-readable medium storing instructions which, when executed by one or more processors of a system, cause the computing device to perform operations comprising selecting a value of user data to transmit to a server, the value selected from a set of user data values collected on a client device; encoding the selected value using a vector of bit values, wherein the encoding updates the bit value at a bit position corresponding to the value of user data; generating a privatized vector by changing, with a predefined probability, one or more bit values of the vector; and transmitting the privatized vector to the server, the server to perform a summation operation with the privatized vector to estimate a frequency of the value of user data from a set of multiple client devices.

In one embodiment, differentially privatizing the vector includes changing at least some of the bit values with the predefined probability of $1/(1+e^\varepsilon)$, where $\varepsilon$ is a privacy parameter. The set of possible user data values can be indexed as a set $[p]=\{1, \ldots, p\}$, the value of user data can be stated as $d \in [p]$, the vector of bit values is v, and wherein updating the bit value includes updating $v[d]$. In one embodiment the encoding includes initializing the vector $v \leftarrow [-1]^m \times c_\varepsilon$, where m is a range of possible user data values, and constant $$c_\varepsilon \leftarrow \frac{e^\varepsilon + 1}{e^\varepsilon - 1},$$

and wherein updating $v[d]$ includes flipping a sign of $v[d]$. In one embodiment the summation operation performed by the server determines a frequency of each of the possible user data values amongst the set of different client devices. The summation operation can include, for each of the client devices i, determining a sum by performing the operation sum=sum+$v_i$. The sum of a particular value of user data can be mapped to a Gaussian distribution. Additionally, each bit of the privatized vector is independent and identically distributed. In one embodiment the value of user data represents information related to one or more device features used by a user associated with the client device. In one embodiment, the value of user data represents health data for the user that has been collected by the user device with the consent of the user.

One embodiment provides a device, comprising a processor; and a memory coupled to the processor, the memory storing instructions, which when executed by the processor, cause the processor to perform operations to select a value of user data to transmit to a server from a set of user data values collected on a client device, wherein the set of user data values is an indexed set of data values; encode the selected value using a vector, wherein to encode the selected value includes to update a value in a vector, the value associated with the value of the user data; generating a privatized vector by changing, with a predefined probability, one or more values of the vector; and transmitting the privatized vector to the server, wherein the server performs a summation operation with the privatized vector to estimate a frequency of the value of user data amongst a set of different client devices.

One embodiment provides for a non-transitory machine-readable medium storing instructions which, when executed by one or more processors of a system, cause the computing device to perform operations comprising selecting a value of user data to transmit to a server from a set of user data values collected on a client device; encoding the selected value using a Hadamard matrix, wherein the encoding flips a sign of an element of the Hadamard matrix, and wherein the element is selected based on the value of user data and a random integer; privatizing the element by flipping, with a predetermined probability, a sign of the element; and transmitting the privatized element and the random integer to the server, wherein the server performs a summation operation with the privatized element to estimate a frequency of the value of user data amongst a set of different client devices.

One embodiment provides a device comprising a processor; and a memory coupled to the processor, the memory storing instructions, which when executed by the processor, cause the processor to perform operations comprising selecting a value of user data to transmit to a server amongst a set of possible user data values collected on a client device, wherein the set of possible user data values is indexed as a set $[p]=\{1, \ldots, p\}$, and the value of user data is $d \in [p]$; encoding the selected value using a p×p Hadamard matrix H, wherein the encoding flips a sign of an element u of the Hadamard matrix, wherein the element $u \leftarrow H(d,j)$, where j is a random integer selected from a set $0, \ldots, p-1\}$; differentially privatizing the element by flipping a sign of the element with a predefined probability; and transmitting the privatized element and the random integer to the server, wherein the server performs a summation operation with the privatized element to estimate a frequency of the value of user data amongst a set of different client devices.

In the foregoing specification, example embodiments of the disclosure have been described. It will be evident that various modifications can be made thereto without departing from the broader spirit and scope of the disclosure as set forth in the following claims. The specification and drawings are, accordingly, to be regarded in an illustrative sense rather than a restrictive sense.

What is claimed is:

1. A non-transitory machine-readable medium storing instructions which, when executed by one or more processors of a computing device, cause the computing device to perform operations comprising:

selecting a value of user data to transmit to a server, the value selected from a set of user data values collected on a client device;

encoding the selected value using a vector of a set of bit values, wherein the encoding updates a bit value of the vector at a bit position corresponding to the value of user data;

generating a privatized vector by selectively flipping a sign, in accordance with a predefined probability based on a privacy parameter, of one or more bit values of the vector on the client device; and transmitting the privatized vector to the server, wherein the server performs a summation operation with the privatized vector to estimate a frequency of the value of user data amongst a set of different client devices.

2. The non-transitory machine-readable medium of claim 1, wherein the privatized vector is locally differentially private.

3. The non-transitory machine-readable medium of claim 1, wherein the set of user data values is an indexed set of data values.

4. The non-transitory machine-readable medium of claim 3, wherein encoding the selected value using a vector of bit values includes initializing the vector of bit values and encoding updates to the bit value at the bit position corresponding to the value of user data includes flipping the sign of the value of user data.

5. The non-transitory machine-readable medium of claim 1, wherein the summation operation performed by the server includes summing a privatized vector value from each client device in a set of multiple client devices to determine a frequency of a user data value from the set of multiple client devices.

6. The non-transitory machine-readable medium of claim 5, wherein a sum of a particular value of user data maps to a Gaussian distribution and wherein each bit of the privatized vector is independent and identically distributed.

7. The non-transitory machine-readable medium of claim 1, wherein the value of user data represents information related to one or more device features used by a user associated with the client device.

8. The non-transitory machine-readable medium of claim 1, wherein the value of user data represents health data for a user that has been collected by a user device.

9. The non-transitory machine-readable medium of claim 1, wherein the value of user data represents an activity type performed by a user.

10. A device, comprising:
a processor; and
a memory coupled to the processor, the memory storing instructions, which when executed by the processor, cause the processor to perform operations to:
select a value of user data to transmit to a server, the value selected from a set of user data values collected on a client device;
encode the selected value using a vector of a set of bit values, wherein the encoding updates a bit value of the vector at a bit position corresponding to the value of user data;
generate a privatized vector by selectively flipping a sign, in accordance with a predefined probability based on a privacy parameter, of one or more bit values of the vector on the client device; and
transmit the privatized vector to the server, wherein the server performs a summation operation with the privatized vector to estimate a frequency of the value of user data amongst a set of different client devices.

11. The device as in claim 10, wherein the privatized vector is locally differentially private.

12. The device of claim 10, wherein to update the value in the vector includes to flip the sign of the value of the user data encoded into the vector.

13. The device of claim 10, wherein the summation operation performed by the server is to determine a frequency of a user data value from the set of different client devices and a sum of a particular value of user data maps to a Gaussian distribution.

14. The device of claim 10, wherein the value of user data represents information related to one or more device features used by a user associated with the client device.

15. The device of claim 10, wherein the value of user data represents health data for a user that has been collected by a user device.

16. The device of claim 10, wherein the value of user data represents an activity type performed by a user.

17. A method, the method comprising:
selecting a value of user data to transmit to a server, the value selected from a set of user data values collected on a client device;
encoding the selected value using a vector of a set of bit values, wherein the encoding updates a bit value of the vector at a bit position corresponding to the value of user data;
generating a privatized vector by selectively flipping a sign, in accordance with a predefined probability based on a privacy parameter, of one or more bit values of the vector on the client device; and
transmitting the privatized vector to the server, wherein the server performs a summation
operation with the privatized vector to estimate a frequency of the value of user data amongst a set of different client devices.

18. The method of claim 17, wherein the set of user data values is an indexed set of data values.

19. The method of claim 18, wherein encoding the selected value using a vector of bit values includes initializing the vector of bit values and encoding updates to the bit value at the bit position corresponding to the value of user data includes flipping the sign of the value of user data.

20. The method of claim 17, wherein the summation operation performed by the server includes summing a privatized vector value from each client device in the set of different client devices to determine a frequency of a user data value from the set of different client devices.

* * * * *